United States Patent [19]
Pauley et al.

[11] Patent Number: 4,918,432
[45] Date of Patent: Apr. 17, 1990

[54] HOUSE ARREST MONITORING SYSTEM

[75] Inventors: James D. Pauley, Estes Park; Allen E. Ripingill, Jr., Louisville; James B. Waite, Loveland; John Loyd, Boulder, all of Colo.

[73] Assignee: B. I. Incorporated, Boulder, Colo.

[21] Appl. No.: 394,291

[22] Filed: Aug. 15, 1989

Related U.S. Application Data

[63] Continuation of Ser. No. 251,018, Sep. 27, 1988, abandoned, which is a continuation of Ser. No. 877,317, Jun. 23, 1986, abandoned.

[51] Int. Cl.[4] ...................... G08B 23/00; G05B 23/02; G08C 19/00

[52] U.S. Cl. ............................... 340/573; 340/825.08; 340/825.72; 379/38

[58] Field of Search ............................... 340/572–576, 340/514–516, 539, 825.49, 505–506, 825.08, 825.34, 531, 825.72; 342/27; 455/7, 9, 14, 100; 379/38, 40

[56] References Cited

U.S. PATENT DOCUMENTS

| | | | |
|---|---|---|---|
| 3,478,344 | 11/1969 | Schwitzgebel | 340/312 |
| 3,882,277 | 5/1975 | DePedro | 179/2 DP |
| 3,898,984 | 8/1975 | Mandel | 128/2.1 A |
| 4,259,665 | 3/1981 | Manning | 340/575 |
| 4,342,986 | 8/1982 | Buskirk et al. | 340/506 X |
| 4,559,526 | 12/1985 | Tani et al. | 455/7 X |
| 4,598,275 | 7/1986 | Ross et al. | 340/573 |
| 4,622,544 | 11/1986 | Bially et al. | 340/573 X |
| 4,665,387 | 5/1987 | Cooper et al. | 340/572 |
| 4,682,155 | 7/1987 | Shirley | 340/573 |
| 4,747,120 | 5/1988 | Foley | 379/38 |

FOREIGN PATENT DOCUMENTS 2141006A 12/1984 United Kingdom .

OTHER PUBLICATIONS

A. K. Schmidt, "Electronic Monitoring Equipment", NIJ Reports, Feb. 28, 1986.

"Judge Orders House Arrest"; LA Times; Sep. 11, 1985; Part I, p. 3.

"State to Test Electronic Home Jail"; Albuquerque Journal; Mar. 9, 1983; p. A-1, A-3.

"Electronic Handcuff Keeps Tabs . . . "; The Oregonian; Mar. 10, 1983, p. B-12.

"Computer-Age Ball & Chain"; Arizona Republic; Mar. 13, 1983.

"Electronic Handcuffs . . . "; Houston Chronical; Mar. 11, 1983.

"Big Brother . . . Test Program"; Albuquerque Tribune; Mar. 9, 1983; p. A-3.

(List continued on next page.)

*Primary Examiner*—Glen R. Swann, III
*Assistant Examiner*—Thomas J. Mullen, Jr.
*Attorney, Agent, or Firm*—Fitch, Even, Tabin & Flannery

[57] ABSTRACT

A house arrest monitoring system that automatically verifies the presence or absence of prisoners, patients or other personnel who are required to remain at a prescribed location or to report to the prescribed location at a certain time. The system includes an identification tag that is worn by the individual being monitored. This tag transmits an identification signal that includes a unique identifying code, as well as status information that indicates whether the tag has been removed from near the flesh of the individual being monitored. The tag is totally self-contained and includes circuitry to sense when the tag is held near the flesh of the individual, as well as code generating and transmitting circuitry to periodically generate and transmit the identification signal. A field monitoring device (FMD) is included at the prescribed location to receive and process the identification signal, and to communicate with a central processing unit (CPU) located at a remote central monitoring location. The CPU is able to communicate with a large number of FMD's located at diverse field locations.

27 Claims, 21 Drawing Sheets

OTHER PUBLICATIONS

"No Complaints About Food"; Time Magazine; Mar. 21, 1983, p. 23.
"Weaving a Jail Cell . . . "; Newsweek Magazine; Mar. 21, 1983, p. 53.
"Electronic Monitoring . . . Contract Woes"; Albuquerque Journal; Mar. 16, 1983; p. A-1, A-3.
"District Judge Tests Electronic Monitor"; Albuquerque Journal; Mar. 18, 1983; p. A-1, A-3.
"Electronic Handcuffs Tested"; LA Times; Mar. 18, 1983; Part I, p. 1.
"State Justices to Hear Argument . . . "; Albuquerque Journal; Apr. 13, 1983; p. B-2.
"High Court Studies Electronic Cuffs"; Albuquerque Journal, Apr. 13, 1983, p. B-2.
"Court Silent on Electronic Cuffs"; Albuquerque Journal, Apr. 15, 1983, p. A-7.
"Sentenced to Wear Electronic Ankle Cuffs"; The News-Sun, Apr. 18, 1983, p. 4-A.
"Judge Sentences Bad-Check Writer . . . "; Albuquerque Journal, Apr. 16, 1983, p. B-2.
"Offender's Weekend . . . "; Albuquerque Journal, Apr. 26, 1983, p. B-1.
"Spiderman Cartoon . . . "; Star, Apr. 24, 1983.
"Shackled"; Albuquerque Tribune; Apr. 30, 1983.
"Arrest Ordered . . . "; Albuquerque Journal; May 7, 1983.
"Electronic Bracelet Attracts Attention"; The Hobbs Flare; May 5, 1983, p. 4.
"Electronic Anklet Jail . . . "; The Daily Dispatch; Apr. 27, 1983, p. 32 (Moline, Ill.).
"Don't Give Up, Judge"; Albuquerque Tribune; May 10, 1983.
"Electronic Cuff Test Winds Down . . . "; Albuquerque Tribune; Jun. 8, 1983.
"Illinois Plans Shakles Program"; Albuquerque Journal; Jun. 12, 1983, p. A-8.
"Electronic Anklet Keeps Probationers Out of Jail"; Business Briefs; A.I.D.S.; Jun. 1983.
"Electronic Shakles . . . "; Chicago Tribune; Jun. 26, 1983.
"House Arrest"; Forum Newsfront; Playboy Magazine; Aug. 1983.
Tybor, "Locking Up Old Ideas on Jail Sentences"; New London Conn. Day, Aug. 16, 1983.
"Web Ringer"; Albuquerque Journal; Sep. 29, 1983, p. A-3.
"Justice Dept. Picks Up Tab . . . "; Albuquerque Journal; Oct. 15, 1983.
"Reliance on Probation is Increasing . . . "; Wall St. Journal; May 16, 1983.
"The GOSSlink"; National Incarceration Monitor and Control Services, Inc. (NIMCOS), New Mexico, 4 page brochure (1983).
"CSD Home ESCORT Electronic Monitoring System: The Electronic Alternative to Jail and Prison for Probationers, Parolees, and Work Releases"; Control Data Corporation, CD Corrections Systems, Minneapolis, Minn., 6 page brochure (1985).
"Can You spot The One Who's Doing Time?"; Control Data Corporation, CD Corrections Systems, 4 page Fold-Out brochure (1985).
Meyer, "Crime Deterrent Transponder System"; IEEE Transactions on Aerospace and Electronic Systems; pp. 2-22 (Jan. 1971).
Schwitzgebel and Bird, "Sociotechnical Design Factors In Remote Instrumentation With Humans in Natural Environments"; Behav. Res. Meth. & Instru.; 1970, vol. 2(3); pp. 99-105.
Ford & Schmidt, "Electronically Monitored Home confinement"; NIJ Reports/SNI 194, Nov. 1985.
Ingraham and Smith, "The Use of Electronics in the Observation and Control of Human Behavior and Its Possible Use in Rehabilitation and Parole"; Issues in Criminology, vol. 7, No. 2 (Fall, 1972).
Hatchett, "The Home Confinement Program: An Appraisal of the Electronic Monitoring of Offenders in Washtenaw County, Mich."; Program Bureau, Michigan Dept. of Corrections, Jun. 1987.

FIG. 7
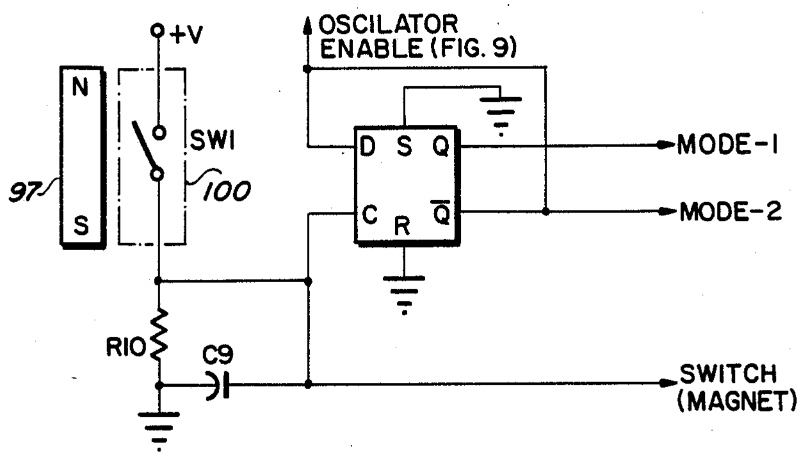
| SWITCH (MAGNET) | OSCILLATOR ENABLE | MODE-1 | MODE-2 | COMMENT |
|---|---|---|---|---|
| 0 (SW1 OPEN) | HIGH | 0 | 1 | OFF |
| 1 (SW1 CLOSED) | LOW | 1 | 0 | CONTINUOUS MODULATION |
| 0 (SW1 OPEN) | LOW | 1 | 0 | ON |
| 1 (SW1 CLOSED) | HIGH | 0 | 1 | CONTINUOUS CARRIER |
FIG. 8
FIG. 11
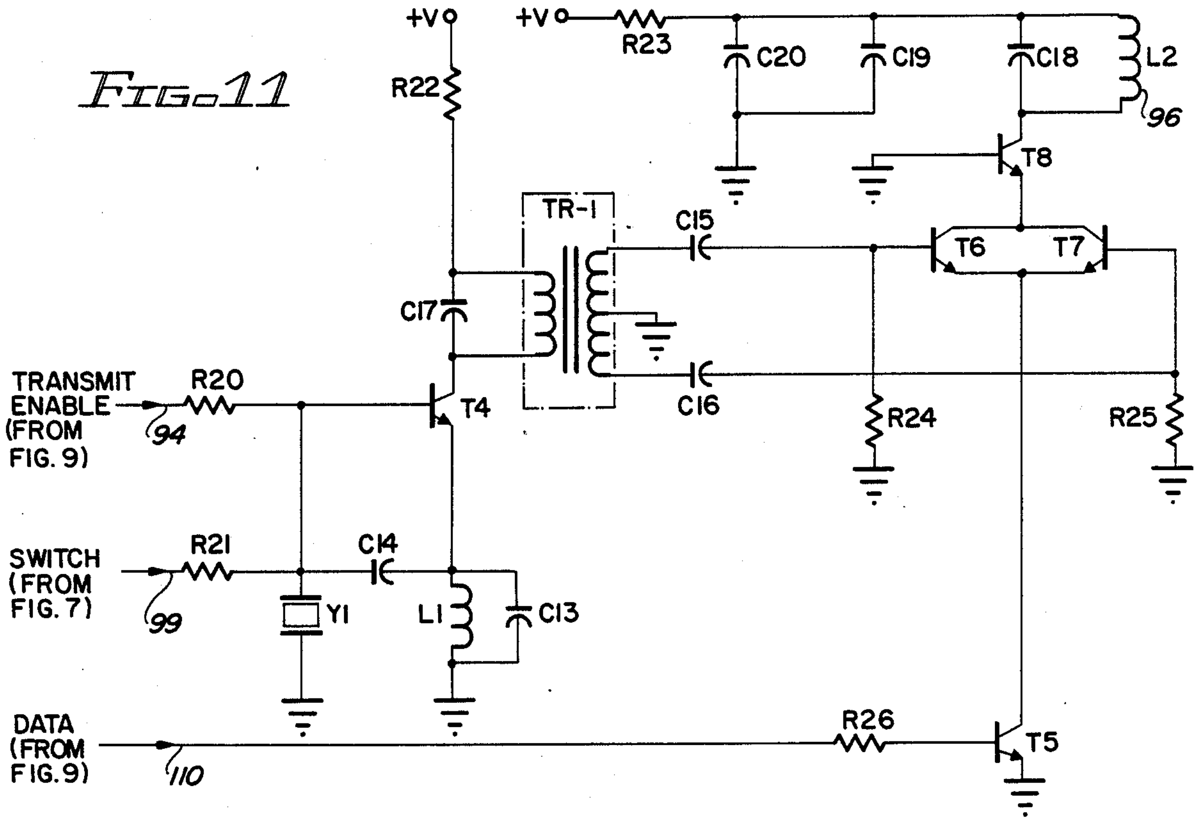

MONITOR SYSTEM OVERVIEW

INPUT DAEMON OVERVIEW

DATABASE DAEMON OVERVIEW

OUTPUT DAEMON OVERVIEW

EXCEPTIONS DAEMON OVERVIEW

HOUSE ARREST MONITORING SYSTEM

This is a continuation application of copending application Ser. No. 07/251,018 filed on 09/27/88 now abandoned; which is a continuation of application Ser. No. 06/877,317 filed 06/23/86,now abandoned.

BACKGROUND OF THE INVENTION

The present invention relates to a personnel monitoring system, and more particularly to a house-arrest monitoring system wherein individuals who wear a special tag can be monitored for compliance with a sentence or order to remain at a prescribed location.

To illustrate a potential application of a house arrest monitoring system of the type disclosed herein, reference is made to a newspaper article appearing in the *Los Angeles Times* on Wednesday, Sep. 12, 1985, Part I, page 3. The article indicated that on Tuesday, Sept. 10, 1985, U.S. District Judge Terry J. Hatter, Jr. sentenced David Alan Wayte to spend "six months under house arrest at his grandmother's home for failing to register for the military draft." While this was reported as "one of the most unusual sentences in recent memory," it is believed to represent a major trend for future sentencing of non-violent offenders. This is particularly evident in view of the ever overcrowded prisons and jails that exist in every jurisdiction across the United States and throughout the world. House arrest thus represents a very significant and viable alternative to conventional incarceration of convicted law breakers, especially those found guilty of non-violent crimes.

While those sentenced to house arrest will generally recognize the need and benefit of complying with the sentence imposed, there nonetheless remains the need to monitor the presence or absence of such individuals to ensure that the sentence imposed is being followed so that justice can be satisfied. For example, in the instance cited above, the attorneys for the convicted individual, David Wayte, wanted the judge to impose community service work as punishment. While community service may be a very appropriate sentence to impose in some instances, the judge felt that because Mr. Wayte was already doing community service on a regular basis, a sentence of house arrest should be imposed to punish Wayte by not allowing him to perform such service. Hence, if Wayte were to violate his sentence by leaving his grandmother's house without the knowledge of the court, the purposes of Judge Hatter's sentence would be frustrated.

While monitoring the presence or absence of a single individual at a prescribed location may seem like an easy task, it really is not, especially if manpower and other resources are limited. Moreover, where there are a large number of individuals who must be monitored, each at a different "house-arrest" location, the problem becomes exceedingly more complex, especially where some of the individuals may not want to fully comply with the need to wear the tag at all times. Hence, there is a need in the art for a system that can efficiently and accurately monitor the presence or absence of a large number of individuals who have been sentenced to remain at specific locations under house arrest. Advantageously, such a system could also be used to monitor the presence or absence of those individuals on parole, i.e., those individuals who are more or less free to move about as they want during certain hours of the day, but who must "report in" at specified locations at specified times.

The present invention meets this need by providing an electronic monitoring system that inexpensively and accurately monitors the house-arrest location of a large number of individuals at a wide variety of different locations. Moreover, such monitoring is accomplished in a way that is not readily noticeable to those persons with whom the monitored individuals come in contact at the house-arrest location, and in a way that is essentially tamper-proof and secure, with suitable alarm messages being promptly given at a central monitoring location in the event that anything out of the ordinary is sensed at a given house-arrest location.

Electronic monitoring systems used to determine and monitor the location of individuals are known in the art. The concept of such electronic personnel monitoring systems probably existed long before the technology was available to realize them. Fictional accounts have long referred to the concept of an electronic personnel monitoring system (e.g., the "Spider Man " comic strip). Numerous press reports have also broadly discribed the benefits of such systems, but have not disclosed the technology for how such systems could be realized.

In Schwitzgebel, et. al., U.S. Pat. No. 3,478,344, there is disclosed a prisoner monitoring system that keeps track of the location of prisoners within a specified boundary. This is accomplished by a system that uses RF transmitters, mounted on the wrist of the prisoner being monitored, and an array of directional antennas that can determine the location of a transmitter with respect to the antenna array. The wrist RF transmitter is powered by a battery pack worn on the prisoner's belt. Two batteries are employed so that the unit remains powered if one battery is removed. The wrist band includes a conductive wire therein that, if broken or cut, is used to signal that the wrist band has been improperly removed.

While the system disclosed in Schwitzgebel may have represented an important advance in the art at the time it was made (1965), there are many reasons why the system disclosed in Schwitzgebel may not provide a viable house arrest system for use today. For example, the large battery pack is unsightly and is cumbersome for the prisoner to wear. The antenna array that must be placed around the premises is likewise unsightly and draws attention to the fact that the location is being monitored. Moreover, the conductive wire check of the wrist band could be easily circumvented if a prisoner wanted to remove the device without being detected. Further, external RF signals could easily interfere with the intended RF signal, or external RF signals could be beamed into the monitored area by an outside accomplice in order to "jam" the system.

In Mandel, U.S. Pat. No. 3,898,984, an ambulatory patient monitoring system is disclosed. A telemetry system using a single RF frequency for each individual to which the system is attached monitors critical body functions. FM modulation is used. A transponder unit worn by the individual is triggered by an interrogating signal, in response to which interrogating signal selected information about the individual, as sensed by special sensors on the individual, is transmitted to a receiver. In this way, the receiver is able to monitor certain body functions of the patient being monitored. However, location information about the patient is not included in the transmitted information In DePedro, U.S. Pat. No. 3,882,277, electrocardiograph information is telemetered from a patient to a telephone transmission link system that carries the informatiomn to a central monitoring location, Thus, a combined telemetry and telephone transmission system is employed to monitor physiological signals. However, as disclosed, such physiological signals do not include the location of the patient being monitored.

In the UK Patent Application of Anders et. al., GB2141006A, a system is disclosed that measures location, identification, or motion. The system therein described uses "passive" tags that may be placed on movable objects. The location of any of these movable objects may be ascertained through a system that uses active transceivers to interrogate the passive tags. In response to such interrogation, the passive tags transmit an identification code. The location of the tag is sensed through the use of multiple antennas spaced at predetermined intervals, or through repeater-relay transceivers spaced at predetermined intervals, around the area being monitored.

From the above it is seen that the prior art teaches electronic monitoring systems that monitor the presence or absence of individuals from a prescribed location and/or specified parameters of an individual at remote locations. To accomplish such monitoring, it is known to use tags worn by movable objects or individuals, RF telemetry to and from such tags, repeaters, and telephone transmission links.

Despite these teachings of the art, however, no viable house arrest monitoring system has yet been developed to applicants' knowledge. This is because there are numerous features that must be present in a viable house arrest monitoring system that are lacking in the teachings of the prior art. For example, it is desirable to have the electronic tag or other device that identifies the individual being monitored (usually some sort of transponding device) to be worn at a location that is not readily visible to the casual observer and at a location where it cannot be removed by its wearer, but at a location where it will not unduly interfere with the activities of its wearer. This requirement can be met if the tag is worn on an ankle, thereby allowing the tag to be readily concealed by the clothes (pants leg and/or sock) of its wearer. However, such use causes the tag to be located very close to the ground, or floor level. When the floor level comprises earth or concrete, as is often the case, some significant transmission problems can result. This is because the RF signal, by necessity a fairly weak signal that is generated for a limited transmission range from a limited energy source, is either absorbed in, or otherwise destructively reflected from the earth or concrete surface. Further, concrete is often heavily laced with reinforced steel, which also tends to interfere with reliable low-energy RF transmissions. Moreover, the walls of the structure whereat the house arrest is being performed may have wire mesh or other metal objects therein that destructively interfere with the transmission of low-energy RF signals.

Simply increasing the energy of the RF signals transmitted from the tag is generally not a viable solution to this problem. In the first place, the tag only has a limited energy source, and it is desirable to have this energy source last for as long as possible. In fact, in accordance with the teachings of the invention herein, the limited energy source (a battery) should be permanently sealed in the tag so that the wearer of the tag has no access thereto, In the second place, higher energy RF signals create numerous other problems for those in the vicinity of the transmission, and as such, must be carefully regulated by the FCC or other regulatory agencies.

A further feature that desirably exists in a viable house arrest monitoring system is that readily noticeable or visible antennas or antenna arrays not be used. Such antennas immediately draw attention to the fact that a house arrest situation exists. Accordingly, the antennas that are used should be of the low profile variety that readily blend into the surroundings of a typical house environment. Further, such antenna(s) and related circuitry must be able to reliably pick up or sense the desired signal and discriminate against destructive reflections or external signals that may be present within the house-arrest structure .

Still a further feature that is of critical importance to the successful use of a house arrest system is the integrity of the system. That is, all components of the system at the house-arrest location must be able to sense and signal the occurrence of any attempts to tamper therewith. Further, while there is nothing that can absolutely prevent the destruction of the system's components at the house arrest location, it is desirable that such destruction or attempted destruction be promptly communicated to a central processing location so that appropriate follow up action can be performed. Most importantly, the electronic identification (ID) tag that is worn by the person under house arrest must not be removable. At a minimum, any attempts to remove the tag should be detectable.

SUMMARY OF THE INVENTION

The present invention provides a reliable house arrest system that automatically verifies the presence or absence of prisoners or other personnel who are required to remain at a prescribed location or to report in at the prescribed location at a certain time. Advantageously, the prescribed location may be a conventional house, apartment, or other building not intended for use as a prison or custodial facility. Typically, the prescribed location will be a resindential house or apartment where other individuals, such as the family of the individual being monitored, may live and work with the individual under house arrest. While such other family members will typically not be under house arrest, the present invention advantageously contemplates that more than one individual under house arrest may share the prescribed house-arrest location, each being individually monitored.

More specifically, the present invention is directed to an identification tag that is worn by the individual under house arrest. Typically, this tag will be worn on the ankle of the individual, and its small size advantageously allows the clothing of the individual to readily conceal the fact that the tag is being worn. The identification tag periodically, such as every 120 seconds, transmits an identification signal that includes a prisoner identification code. This code uniquely identifies the individual being monitored. Other information is also included in the transmitted signal, such as information indicating that someone has attempted to tamper with or remove the tag.

The identification signal generated by the tag is received by a Field Monitoring Device (FMD) that is located within the house-arrest location. A repeater may be selectively positioned around or within the house-arrest facility in order to assure that the FMD always receives an identification signal regardless of the location of the tag (that is, regardless of the location of the individual wearing the tag) within the facility or surrounding environs. The repeater receives the information signal from the tag, holds it for a very short time, and retransmits it. The reception patterns associated with the FMD and the tag for all possible locations of the tag within the facility are checked at the tiem of installation. This initial check identifies any "dead spots" or tag locations where tha tag's identification signal is not properly received by the FMD. The repeater can then be selectively positioned within the house-arrest facility in order to eliminate the effect of such dead spots, thereby helping to assure reliable communication between the tag and the FMD.

To further assure that the FMD reliably receives the information signal transmitted from the tag, the FMD utilizes two receiving antennas that are spaced apart a prescribed distance, which distance is a function of the wavelengh of the transmitted signal. The distance between the antennas is selected such that at least one of the antennas receives the information signal in a non-nulled condition.

The FDM, in accordance with the preferred embodiment, includes a modem for communicating with a central processing unit (CPU) via a telephone link. Other types of communication links, such as microwave or satellite links, could also be employed to couple the FMD to the CPU. Normally, the FMD's will call the CPU whenever there is change associated with the identification signal sensed (received) by the FMD. For example, if the identification signals have been regularly received from the tag and the signal stops being received, the FMD will call the CPU and log a "leave" message. If no signals are being received by the FMD and signals appear, the FMD will call the CPU and log and "enter" message. Such time logs permit the system to determine the approximate time when an individual being monitoring "checks out" or leaves and "check in" or enters the hose arrest location. Additionally, the various FMD's call the CPU at preestablished times stored by the FMD's and CPU's.

Advantageously, the FMD monitors the information signals received from each tag (and FMD can receive signals from a plurality of tags) to monitor the presence, absence and to determine if a tamper condition exists. A tamper condition exists upon detection of an attempt to remove, alter, or otherwise interfere with the normal operation of the system, including the tag and the circuits of the FMD. In such situations, the FMD includes the capability of calling up the CPU to alert it of such a tamper condition.

The CPB is located at a remote location fromthe house-arrest facility, and includes the means for establishing a telephone or other communication link with a large number of FMD's at a large number of house-arrest locations. As indicated above, the FMD's normally call the CPU whenever a leave, enter or tamper condition occurs. Additionally, the CPU will call the various FMD's on a random basis in order to determine if all is well at each location called. If the CPU is unable to establish a telephone link with a given FMD after a prescribed number of attempts, which failure might occur, for example, if the telephone lines or other communication channels had been tampered with, the CPU generates an alarm condition so that appropriate steps can be taken to find out what has happened. Similarly, if the CPU receives a call from an FDM indicating that a tamper condition has been detected, an alarm condition is generated. Advantageously, the CPU is programmed to generate a wide variety of reports that can be used by the monitoring personnel in order to quickly and efficiently determine the status of all of the individuals being monitored at the various house-arrest locations.

A feature of the present invention is that the house arrest system, in addition to automatically verifying the presence or absence of prisoners, also monitors the operating condition of the equipment used thereby providing a means for allowing preventative maintenance to be performed in a timely manner.

An additional feature of the present invention is that the identifying tag worn by the prisoner or other individual being monitored is a self-contained tag that is light-weight, tamper resistant, and that can be worn on a limb of the individual in an unobtrusive manner. Further, the tag is completely sealed, thereby protecting the electronic circuits contained therein from exposure to damaging environments. The tag's housing is made from a substance that is impervious to water and other fluids to which the tag might be exposed. Further, the tag's housing is made from a substance that is confortable and safe to wear when placed against the skin of the individual who must wear it.

Most significantly, an important feature of the present invention is that once tag is placed on the leg or other limb of the individual being monitored, thereby placing the tag in proximity to the individual's skin, any removal of the tag from the leg or other limb can be detected. This is accomplished by combining a continuity check of a conductive strap or band that holds the tag on the individual with a capacitive sending circuit that senses when the tag is near human flesh and when it is not.

Because the tag is sealed, including the battery that is used to power the circuits contained therein, an important feature of the tag is the ability to preserve the life of the battery for as long as possible. Accordingly, the operating circuits of the tag are configured such that they can initially be totally shut down, as when the tag is first manufactured but before it has been assigned to be worn by an individual under house arrest, thereby preserving the life of the batteries contained therein. However, the tag circuits can be selectively switched to operate in a test mode when the device is frist used at a house-arrest location, thereby allowing initial verification of the operation of both the tag and the FMD, followed by a normal operating mode. Such modes of operation are controlled, in the preferred embodiment, by the selective application of a magnetic field.

A further feature of the present invention is that the system is able to reliably operate even in very noisy RF environments. Special tramsmitting circuitry housed in the tag, coupled with corresponding receiving circuitry housed in the FMD, and additionally data decoding software, allow the FMD to reliably discriminate between the intended RF signal generated by the tag and noise.

Still another feature of the present invention is the ability of the FMD to continue its monitoring operation of the tag or tags within the prescribed house-arrest location even in the event of a line power failure. Such a power failure might occur, for example, if the FMD is unplugged (either accidentally or on purpose), or if a wide-spread power failure hits the area where the house-arrest facility is located. Further, even if telephone service is temporarily interrupted, thereby precluding communication between the FMD and the CPU, the FMD continues to store in its memory the events that occur during this time, as sensed by the various sensing circuits housed in the FMD and the information received from the tag in its regularly transmitted information signal, for subsequent transmission back to the CPU once a communication link is reestablished.

BRIEF DESCRIPTION OF THE DRAWINGS

The above and other features and advantages of the present invention will be more apparent from the following more particular description thereof presented in conjunction with the following drawings wherein:

FIG. 7 is a schematic/logic diagram of the Mode Control circuit of the Tag of FIG. 4;

FIG. 8 is a chart or table that illustrates the operating modes of the tag as controlled by the Mode Control circuit of FIG. 7;

FIG. 11 is a schematic/logic diagram of the RF Modulator and Transmitter of the tag of FIG. 4;

DETAILED DESCRIPTION OF THE INVENTION

The pressent invention is bes understood with reference to the drawings, wherein like numerals are used to represent like parts throughout.

Figure 1:
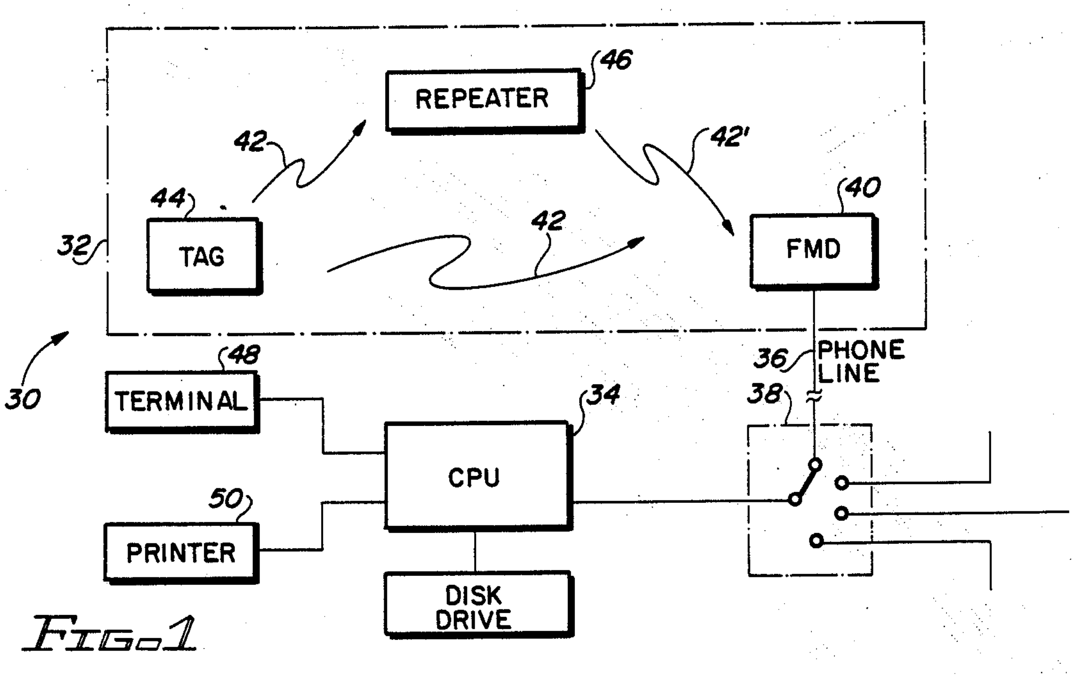
FIG. 1 is a block diagram of the house arrest monitoring system of the present invention.

Referring first to FIG. 1, there is shown a block diagram of a house arrest monitoring system 30 in accordance with the present invention. The system 30 includes a plurality of remote monitoring areas 32 and a central processing unit (CPU) 34. The CPU 34 is coupled to the remote monotoring area 32, in accordance with the preferred embodiment by way of a residential phone line 36. One or more conventional switching stations 38 couple the phone line 36 to the CPU 34. Such switching stations 38 are conventional switching stations commonly employed by the telephone company.

Within each remote area 32 there is included a field monitoring device (FMD) 40. The FMD 40 receives periodic signals 42 from an identification tag 44. These identification signals 42 contain information that uniquely identifies the tag 44 from which the signal originates, and that indicates the status of the circuits internal to the tag, and especially whether such circuits have sensed an attempt to remove the tag.

Depending upon the particular characteristics of the remote monitoring area 32, the system may also include a repeater 46 that can be selectively positioned within the area 32. The purpose of the repeater 46 is to receive the identification signals 42 from the tag 44 andd retransmit these signals, after a short delay, to the FMD 40 to eliminate dead spots. Such retransmitted signals are indentified in FIG. 1 as signals 42'.

While only one tag 44 is shown within the remote monitoring area 32 in FIG. 1, the system of the invention contemplates that a plurality of tags 44 within the monitoring area 32 could be monitored by the same FMD 40, each tag generating its own unique identification signal at periodic intervals.

The CPU 34 can be coupled through the telephone switching network 38 to a large number of remote monitoring areas. As will be explained below, the CPU 34 will typically randomly poll each of the remote monitoring areas with which it can establish a communication link. Coupled to the CPU 34 is at least one terminal 48 that provides a means for the CPU 34 to display the status of the various remote monitoring areas to which it is coupled, as well as to provide an operator the means for entering data or instruction into the CPU. Such terminals 48 are common in the art, typically including a CRT display screen and keyboard. Also coupled to the CPU 34 is a printer 50 that can be used to print status reports and other information concerning the operation of the house arrest monitoring system 30.

Figure 2:
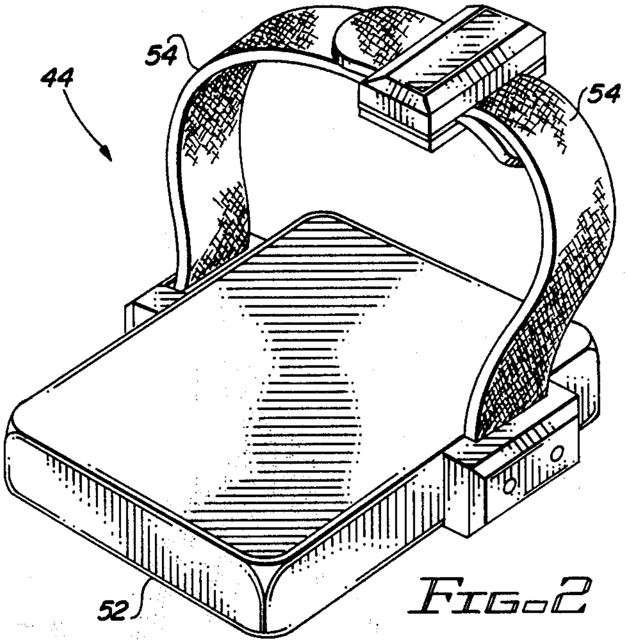
FIG. 2 is a perspective view of the tag that is worn by an individual being monitored by the system of FIG. 1.
Figure 3A:
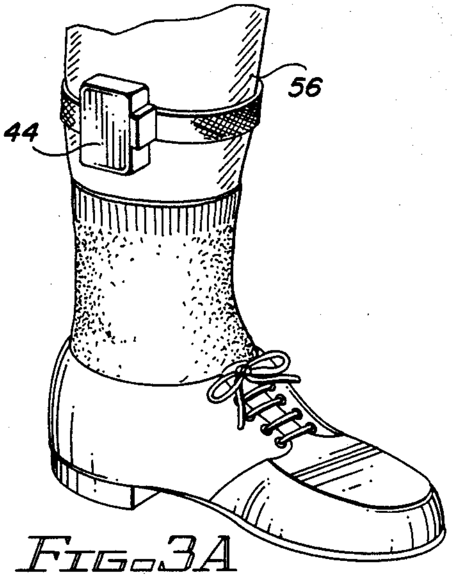
FIG. 3A illustrates one manner in which the tag may be worn.
Figure 3B:
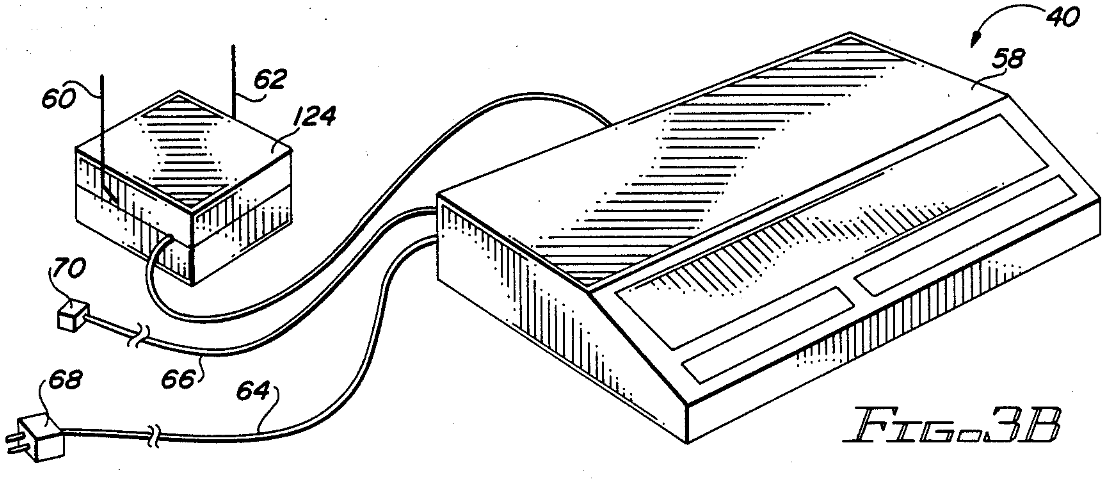
FIG. 3B shows a perspective view of the FMD.

Referring next to FIGS. 2, 3*a* and 3B, there are shown perspective views of the tag 44 and the FMD 40 that are used within the remote monitoring area 32. The tag 44, as best shown in FIG. 2, includes a case or housing 52 and a connecting strap 54. The tag 44 is designed to be worn around a limb, such as an ankle 56, of its wearer, as shown in FIG. 3*a*. As explained more fully bellow, the housing 52 is designed to be comfortably worn against the skin or flesh of its wearer.

The tag is worn with just enough tension in the strap 54 to securely hold the housing 52 near the skin or flesh of the person being monitored. Advantageously, the case 52 is made from a material that is impervious to the normal kinds of fluids with which the case may come in contact, such as water, thereby allowing the tag to be worn at all times.

As will be explained more fully below, the only requirement ot the user is that the tag be held near his or her flesh. Otherwise, a tamper condition will be detected by the circuits within the tag 44.

The case 52 is made from polyestyrene, a type of plastic that is hard and durable. In the preferred embodiment the tag measures no more than three inches square by one inch thick. It weighs less than eight ounces. The straps 54 are made from a commercially available conductive material.

In FIG. *3b*, a perspective view of the FMD 40 and receiver 124 is shown. The FMD 40 is totally self contained. It is housed in a low profile package or housing 58 that is simple,, unobstrusive, and that easily blends into the environment of a typical household. The FMD 40 contains no visible dials or control that are accessible to those in the household. However, it does include appropriate lights or other indicators to indicate the operating status thereof. Two antennas, 60 and 62, are connected to the receiver 124 which is attached to the FMD 40. These antennas comprise a length of wire that may be hung or draped down behind the unit in a location that is not visible to the casual observer.

Also available at the rear of the devise is a power line cord 64 and a phone line cord 66. The power line cord 64 includes a transformer 68 for plugging into a standard AC outlet socket. Similarly, the phone line cord 66 may contain a standard quick-connect modular phone jack 70 of the type used for connecting conventional telephones to a telephone line. Alternatively, special retainers may be employed in conjunction with the conventional plugs 68 and 70, and their corresponding sockets, which retainers can only be removed with a appropriate tool or key, and which are wired into the tamper circuits of the FMD 40 (so that any attempt to remove the retainers in order to unplug either the transformer or phone jack signals a tamper condition).

The Tag

Figure 4:
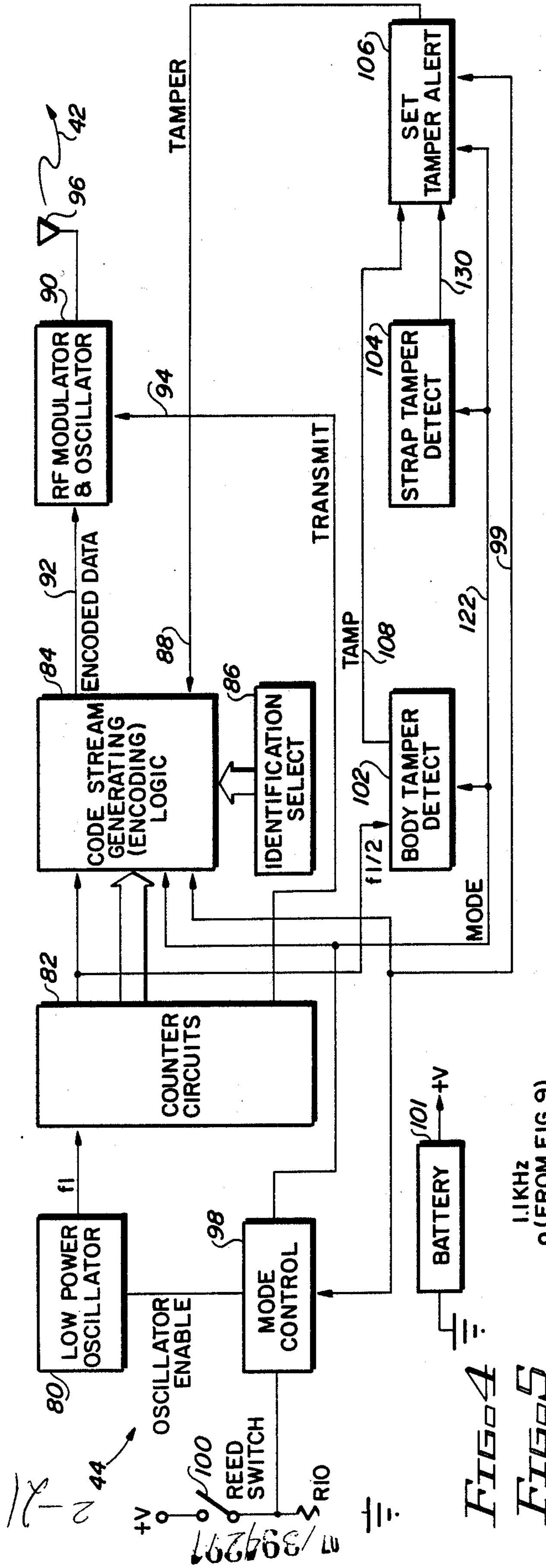
FIG. 4 is a block diagram of the circuits contained in the tag of FIG. 1.

Referring next to FIG. 4, a block diagram of the circuits within the identification tag is shown. A low power circuit 80 serves as an oscillator to provide a basic clock signal for operation of the circuit. Counter circuit 82 count the ocurrence of clock cycles in order to regulate the time at which an identification signal 42 is transmitted from the tag. As indicated previously an identification signal is transmitted about every 120 seconds. The oscillator 80 and the counter circuits 82 define the 120 second interval (or other selected interval) between transmissions. The 120 second interval is, of course only exemplary. Other appropriate intervals may be used. Moreover, due to the variation in tolerances of the component values and supply voltages that exist between the oscillator 80 circuits from one tag to another, it is not lilkely that two tags will ever exhibit precisely the same time interval between transmission of their respective identification signals. This helps assure that no two identification signals from two separate tags will ever continuously occur at precisely the same times, thereby interferring with each other.

The timing signals from the counter circuits 82 are directed to encoding logic 84. A code select circuit 86 defines a unique identification code that is also directed to the encoding logic 84. The encoding logic 84 also receives an indication over signal line 88 as to whether a tamper condition has been detected. The tamper signal and code information are combined in the encoding logic 84 at the appropriate time in order to create a word of encoded data that is passed on to an RF modulator and oscillator 90 over signal line 92. As synchronized by a transmit pulse received over signal line 94 from the counter circuits 82, the RF modulator and oscillator 90 generates and RF carrier signal, modulated with the encoded data, that is transmitted from antenna 96. The identification signal transmitted from the antenna signal 96 is represented by the arrow 42 in the FIG. 4 and FIG. 1.

A mode control circuit 98 is also present within the tag 44. This mode control circuit defines one of four possible operating modes of the circuits within the tag. These four operating modes are discussed in more detail below. The particular mode of operation for the tag is controlled by the selective closing or opening of reed switch 100. The reed switch 100 is embedded within the tag 44, and the selective closure thereof can be effectuated by moving a magnet of sufficient strength within a prescribed distance of the tag. In this way, the operating mode of the tag can be selectively controlled without the use of any external switches, push buttons, or other manually actuated devices accessible on the surface of the tag case or housing 52.

Further included in the tag 44 is a tamper detect circuit 102 and a strap continuity check circuit 104. As explained more fully below, the tamper detect circuit 102 determines whether the tag 44 is being held near the flesh or skin of the tag's wearer. If this circuit detects that the tag is not being held near the skin of the tag wearer, a TAMP signal is generated and sent to a set tamper alert circuit 106 over signal line 108. Similarly, if the strap continuity check circuit 104 determines that the continuity of the strap 54 has been broken, an appropriate alert signal is sent to the set tamper alert circuit 106. Accordingly, in response to either a TAMP signal from the tamper detect circuit 102, or an alert signal from the strap continuity check circuit 104, the set tamper alert circuit 106 generates a tamper signal that is sent to the encoding logic 84 over signal line 88.

Figure 5:
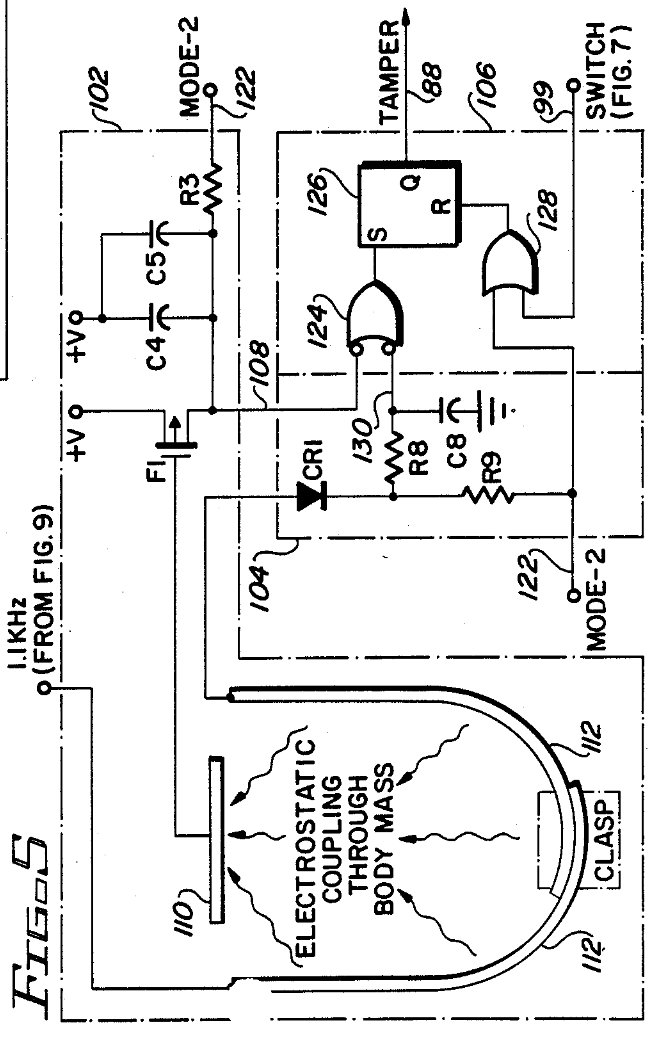
FIG. 5 is a schematic/logic diagram of the Tamper Detect and Strap Continuity Check circuits of the Tag of FIG. 4.
Figure 6:
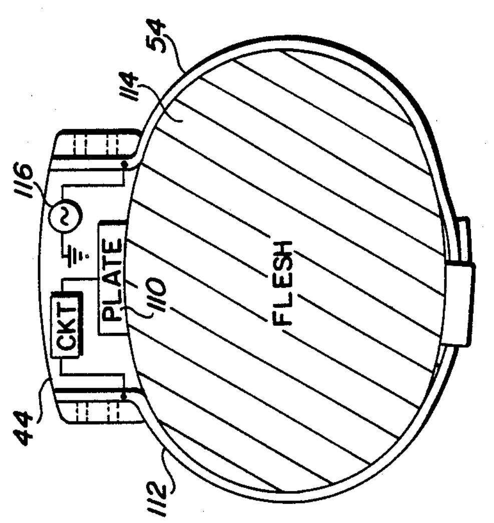
FIG. 6 is a cross-sectional view of the tag as it is worn or placed near the flesh or skin of its wearer, and illustrates the capacitive plates or electrodes contained within the tag strap and their relationship to the flesh of the wearer.

Referring next to FIGS. 5 and 6, a description of the tamper detect circuit 102 and the strap continuity check circuit 104 will be presented. The function of the tamper detect circuit 102 is to determine when the tag 44 is being held near the skin or flesh of its wearer and when it is not. This determination is made using a unique mass detection circuit that includes a first capacitor plate 110 and a second capacitor plate or element 112. In the preferred embodiment, the second capacitive element or plate 112 is realized with the conductive strap 54 (FIG. 2) that holds the tag 44 near the skin (body mass) of its wearer.

The table 110 and strap 112 function as the plates of a capacitor, and the flesh 114 therebetween serves as the diaelectric material of the capacitor that separates one element from the other. An oscillator signal 116 from an oscillator (e.g., a signal derived from the oscillator 80) is applied to strap 112 and is capacitively coupled across the body mass to plate 110. So long as the body mass remains between strap 112 and plate 110, the signal coupled to plate 110 (a 1.1 KHz signal in the preferred embodiment) appears at the gate of field effect transistor (FET) switch F1. This coupled signal icludes negative-going spikes that turn on F1 momentarily. These momentary turn ons are sufficient to maintain parallel capacitors C4 and C5 discharged to a positive volatage potential, +V. (From FIG. 5 it is seen that capacitors C4 and C5 are connected in parallel across F1, with one side of this parallel combination being connected to +V and the other side—the drain side of F1—being connected to signal line 108.) Thus, so long as switch F1 is momentarily turned on, signal line 108 remains high, indicating a non tamper (NON TAMP) condition. If pulses are not coupled through to plate 110, which occurs when the body mass is removed from between the strap 112 and the plate 110, switch F1 does not turn on at all, and the drain side of capacitors C4 and C5 charges through resistor R3 to a negative potential (e.g., ground) causing the TAMP signal to go low. Thus, a low signal on signal line 108 indicates the absence of flesh next to the tag 44. This low signal passes through OR gate 124 and causes a flip flop 126 to be set. The Q output of flip flop 126 functions as the tamper signal that is delivered to the encoding logic 84 (FIG. 4) over signal line 88.

Both the gate 124 and the flip flop 126 are part of the set tamper alert circuit 106. Also included as part of this circuit is an OR gate 128, the output of which is directed to the reset terminal of flip flop 126. One input of the OR gate 128 is the magnet signal obtained from reed switch 100 (FIG. 4). This magnet signal is normally low in the absence of a magnet. The other input is connected to signal line 122 (MODE-2 signal line), and is low during normal operation. When either the MODE-2 signal or the magnet signal go high, the flip flop 126 is reset.

Also shown in FIG. 5 is the strap continuity check circuit 104. As indicated previously the strap 54 is used to hold the tag 44 near the flesh of its wearer. This strap is made from conductive material. Accordingly, an electrical signal may pass therethrough. One end of the strap is connected to the oscillator signal 116 (a 1.1 KHz signal). The other end of strap 54 is connected to the cathode of diode CR1 of the continutity check circuit 104. The anode of diode CR1 is connected through resistor R8 to the other input of gate 124. This point is also coupled to a negative potential source (e.g., ground) through resistor R9. A holding capacitor C8 is connected to the junction of R8 and one of the inputs of gate 124. During normal operation—that is, when the continuity of the strap 54 is maintained—the oscillator signal will keep capacitor C8 charged to a high level. However, should the strap 54 be broken, the voltage appearing on capacitor C8 will discharge through resistors R9 and R8, thereby causing signal line 130 to go low. In turn, this action will cause flip flop 126, of the set tamper alert circuit 106, to be set, thereby generating a tamper signal.

Referring to FIGS. 7 and 8, various operating modes of the tag 44 are explained. As previously indicated in connection with the discussion of FIG. 4, a magnetic reed switch 100 is embedded in the tag 44 at a location where the application of an external magnet can close the switch. (This magnetic reed switch 100 is also identified in FIGS. 7 and 8 as SW1.) The mode control circuit 98 of FIG. 4 is realized with a D-type flip flop 98 as shown in FIG. 7. The D input of flip flop 98 is connected to the Q* (inverse of Q) output of the same flip flop. This same signal also serves as an ENABLE signal for oscillator 80 (FIG. 4). This signal must be low before oscillator 80 can begin to operate. The clock input, or C input, of the flip flop 98 is connected to resistor R10, capacitor C9, and reed switch 100. As indicated in FIG. 7, one side of reed switch 100, which is normally open in the absence of a magnetic field, is tied to the positive voltage reference +V. The other side is tied to one end of resistor R10. Capacitor C9 parallels resistor R10. The clock input of flip flop 98 is connected to that side of R10 that is connected to the magnetic reed switch 100. Accordingly, when the reed switch 100 is open, the signal appearing on the clock input is low. When the reed switch 100 is closed, as when a magnetic field is applied, the clock input rises to the +V potential, thereby changing the state of flip flop 98. (As depicted in the figure, flip flop 98 is clocked on the leading or positive-going edge of the clock signal.)

FIG. 8 defines the various operating modes associated with the mode control circuit 98. When initially manufactrued, flip-flop 98 is reset, meaning that the Mode-1 signal is "0", and the Mode-2 signal is "1". This state remains until the reed switch 100 is closed. In this initial mode of operation, all of the circuits of the tag, with the exception of flip flop 98, are off, thereby preserving the battery life of the battery 101 included in the tag. It is noted that even though power is applied to flip flop 98, when this flip-flop is a CMOS device, it is also effectively off inasmuch as it draws very little current, except when it is switching from one state to the other.

When a magnet is first applied so as to close the magnetic reed switch 100 (SW1), the flip flop 98 is latched such that the Mode-1 signal is high, or a logic "1", and the Mode-2 signal is low, or a logic "0". These two signals, in this state, coupled with the Switch (Magnet) signal on signal line 99, define a testing/start-up mode of operation for the tag 44. In this mode of operation, the identification signal is transmitted continuously by the tag. When the external magnet 97 is removed, thereby opening the magnetic reed switch 100, the tag reverts to its normal mode of operation wherein the identification signal is transmitted about every 120 seconds. During this normal mode of operation, the Switch signal is low, the Mode-1 signal remains high, and the Mode-2 signal remains low. If the magnetic reed switch 100 is subsequently closed, thereby causing the Mode-1 signal to go low and the Mode-2 signal to go high, a CW transmit mode of operation is initiated wherein the tag transmits a continuous RF signal which contains no data. This mode of operation is useful during initial set-up and testing. The normal mode of operation is reentered simply by removing, reapplying, and removing the magnet, thereby cycling the flip-flop 98 back through the off and testing/start-up modes to the normal run mode.

Figure 9:
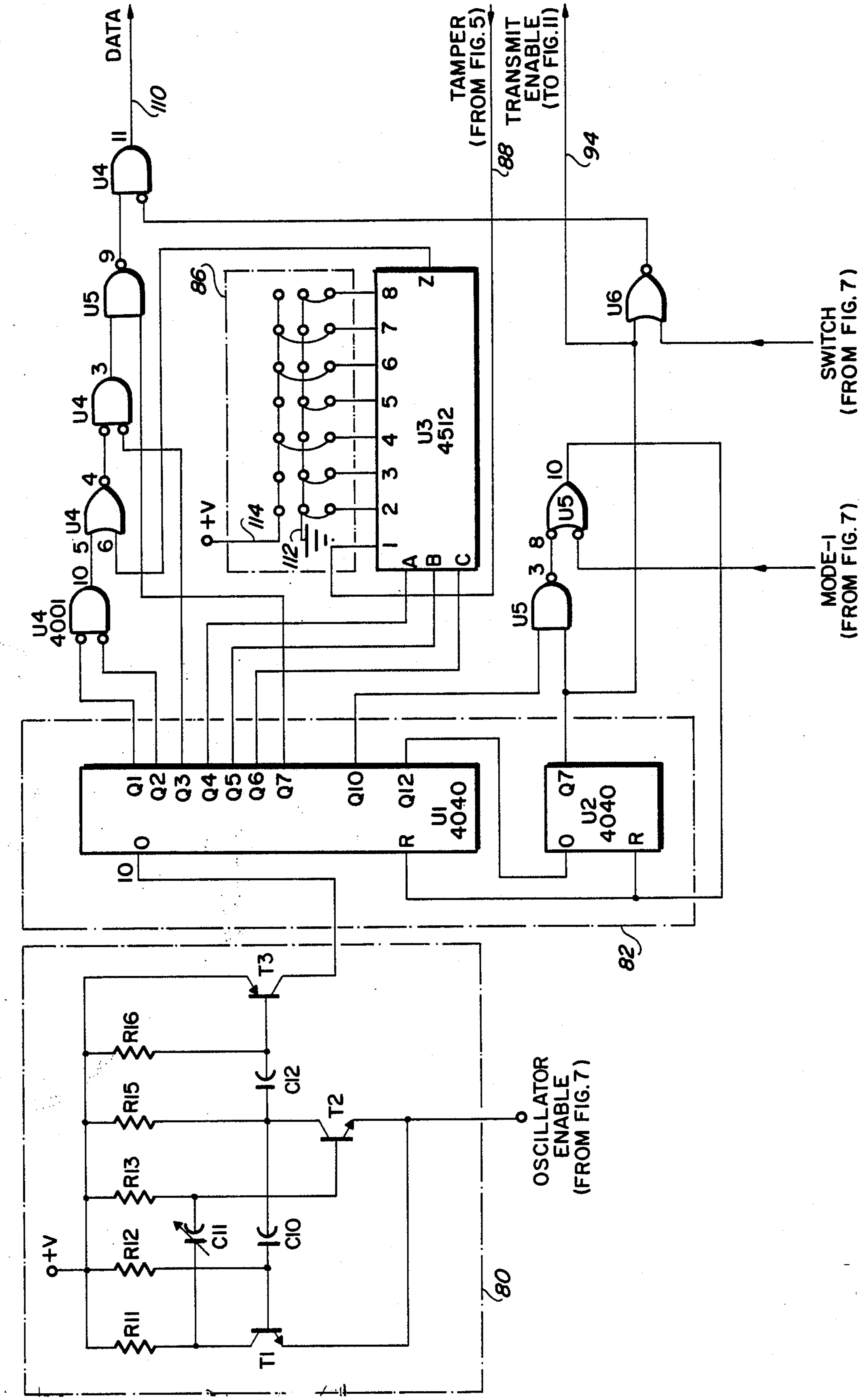
FIG. 9 is a schematic/logic diagram of the ASMV and Encoding Logic of the Tag of FIG. 4.

Referring next to FIG. 9, a logic/schematic diagram of the oscillator 80, the Counter Circuits 82, the Encoding Logic 84, and the Code Select Logic 86 of the tag 44 (FIG. 4) is shown. The oscillator 80 is a very low power circuit. The circuit operation is more or less conventional. That is, two NPN transistors T1 and T2 are cross coupled such than when one transistor is off, the other is on, and vice-versa. The cross coupling occurs through the use of capacitor C10, coupling the base of T1 to the collector of T2; and through the use of capacitor C11, coupling the base of T2 to the collector of T1. When T1 turns on, the change in voltage at the collector of T1 is coupled through C11 to the base of T2, thereby turning T2 off. However, the voltage at the base of T2 slowly rises as capcitor C11 is charged through resistor R13. When the turn-on threshold of T2 is reached, T2 turns on, dropping the voltage at the collector of T2, which drop is coupled through C10 to the base of T1, thereby turning off T1. T1 remains off until the voltage at its base rises to its threshold turn-on level, as C10 is charged through resistor R12. The cycle thus repeats itself and T1 and T2 alternately switch between on and off states, thereby causing a periodic signal to appear at the collector of T2. Resistors R11 and R15 are used as pull up resistors, coupling the collectors of T1 and T2 respectively to the positive voltage potential +V.

The emitters of T1 and T2 are tied together and connected to the Oscillator Enable line coming from the Mode Control Circuit 98 (FIGS. 4 and 7). The osicllator 80 can not begin operating until the Enable line goes low. Because it is desirable to operate the oscillator 80 at very low power levels, the currents that flow through T1 and T2 are made very small by making the values of resistors R11 and R15 very large. The frequency of operation is controlled by the values of R12 and C12, and R13 and C10. In the preferred embodiment, the frequency of operation is set at about 2.2 KHz. Coupling capacitor C12 transfers the periodic signal appearing at the collector T2 to the base of PNP transistor T3, the emitter of which is tied to the +V potential. Resistor R16 is a bias resistor that is connected between the base and the emitter of T3. The operation of stage T3 serves to square up the edges of the periodic basic clock signal that is generated by the ASMV operation of T1 and T2. The collector of T3, on which appears the basic clock signal, is directly connected to the counter circuit 82.

Counter Circuits 82 are realized with CMOS integrated circuits (IC's) U1 and U2. Each of these IC's contain a sesquence of flip flops, the respective outputs of which are designated in the figure as Q1, Q2, Q3, . . . Q12. The IC's U1 and U2 are of a type that are readily available from numerous IC vendors under the generic title "12-bit binary counter" and the generic number 4040. (For example, if these devices are procured from Motorola, they are identified as part number MC14040B.)

The respective output signals Q1, Q2, etc., from U1 and U2 comprise square waves that have frequencies that are successively divided by two. Hence, the first state output (designated as Q1 in FIG. 9, although sometimes the first stage is referred to as Q0 in the art) signal has a frequency that is ½ that of the input signal (received from the oscillator 80). The Q2 signal has a frequency that is ½ that of Q1. The Q3 signal has a frequency that is ½ that of Q2, or ¼ that of Q1, and so on. All of these signals are combined in the encoding logic 84 in such a way that an encoded data signal 110 is ultimately generated, as best illustrated in the timing diagram of FIG. 10.

Figure 10:
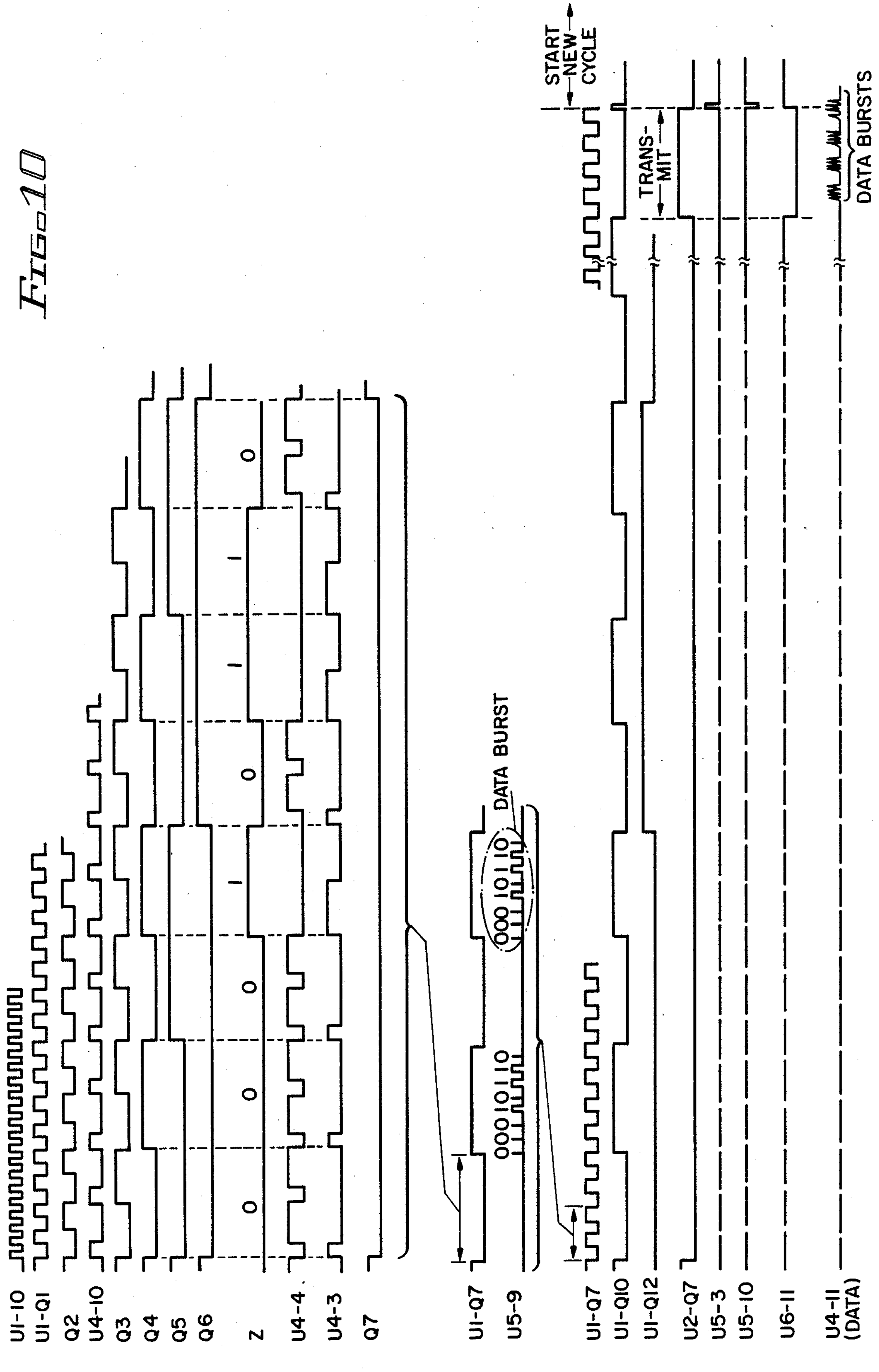
FIG. 10 is a timing diagram that illustrates some of the key signals associated with the operation of the circuits of FIG. 9.

An important element in the generation of the encoded data signal 110 is the data encoder U3. This circuit receives a code word that is preselected and hardwired in the code select circuitry 86. As indicated in FIG. 9, Code Select circuitry simply comprises a connection block where up to 7 bits can be selectively hard-wired to be either a logic "1" or a logic "0" by the application of jumper wires, or equivalent, between a ground bus 112 or a voltage bus 114 and an output pin. The code word set by the jumper wires shown in FIG. 9 is thus "0010110", assuming ground is a logic "0" and +V is a logic "1". At appropriate times, as determined by the application of the timing signals Q4, Q5, and Q6, respectively applied to address inputs A, b, and C of encoder U3, the bits defined by the code word are serially passed out the output terminal of U3 (designated as pin "Z") to pin 6 of NOR gate U4. These bits are then interleaved into the processing of the other timing signals by gates U4, U5 and U6 to produce the data signal 110 appearing on signal line 110 (pin 11 of U4), as illustrated in the timing diagram of FIG. 10. It is noted that the signals shown in FIG. 10 are exemplary only, and are not intended to be limiting.

Referring next to FIG. 11, a schematic diagram of the RF Modulator and Transmitter 90 of the identification tag 44 is shown. NPN transistor T4, crystal Y1, inductor L1, and capacitor C13 comprise a local oscillator stage that is enabled whenever the Transmit line 94 is high. In the preferred embodiment this stage oscillates at approximately 75 MHz. The Transmit signal is coupled to the base of T4 through resistor R20, thereby providing a bias signal that allows T4 to oscillate at a frequency that is controlled by the crystal Y1. The switch signal 99 is also coupled to the base of T1 through resistor R21. During normal operation, it will be recalled that the Switch signal is low, and therefore it does not influence the local oscillator stage. However, during certain modes of operation (see FIGS. 7 and 8), this signal goes high (when reed switch 100 closes), thereby enabling the local oscillator to generate the 75 MHz. signal.

Capacitor C17 and resistor R22 are connected in series in the collector circuit of T4. A primary winding of transformed TR-1 is connectd in parallel with C17. The inductance associated with TR-1 and the capacitance of C17 are selected to be tuned at approximately 152 MHz., thereby causing these components to function as a frequency doubler circuit.

A secondary winding of TR-1 is coupled to the bases of NPN transistor pair T6 and T7 through capacitors C15 and C16 respectively. The emitters of T6 and T7 are connected together, as are the collectors. Resistors R24 and R25 are connected to the base terminals of T6 and T7 respectively to provide a bias current therefor. The joined emitters are connected to the collector of NPN transistor T5, the base of which is coupled through resistor R26 to the data signal line 110. Transistors T6 and T7 function as a rectifier circuit with respect to the 150 MHz signal applied to their base terminals, thereby serving the function of another frequency doubler circuit. The emitter of another NPN transistor T8, with its base terminal grounded, is connected to the collectors of T6 and T7. The collector of T8 is connected to one side of a tank circuit made up of capacitor C18 and inductor L2. Inductor L2 functions as the antenna 96 of the tag 44. The other side of this tank circuit is coupled to the +V potential through resistor R23. Capaitors C19 and C20 are also used to shunt undesired high frequencies to ground appearing at the junction of C18, L2 and R23. Transistors T6, T7 and T8 may be realized with an MPS 5179 transistor, manufactured by Motorola. Transistor T5 may be a 2N3904.

In operation, whenever the transmit signal goes high, data appearing on signal line 110 modulates the current that is allowed to flow through the tank circuit comprised of C18 and L2. The basic frequency of this signal is approximately 303 MHz, modulated (turned off and on) by the data signal. When the Transmit, Switch, and Data signals are all low, which is all but a very short period of time (see FIG. 10), the RF Modulator and Transmitter Circuit 90 is completely shut off, thereby preserving power.

The Field Monitoring Device (FMD)

As is evident from the description thus far given, the tag 44 generates an identification signal 42 that is periodically transmitted, approximately every 120 seconds, in a group of short data bursts. This identification signal is generated at all times regardless of where the tag is located, that is, regardless of where the person being monitored is located. (Only when a magnet is used to enable a different operating mode of the tag is this pattern of generating the identification signal not followed.) If the person being monitored is within the designated area 32 (FIG. 1), then the identification signal 42 will be received by the FMD 40. The construction and operation of the FMD 40 will now be described.

Figure 12:
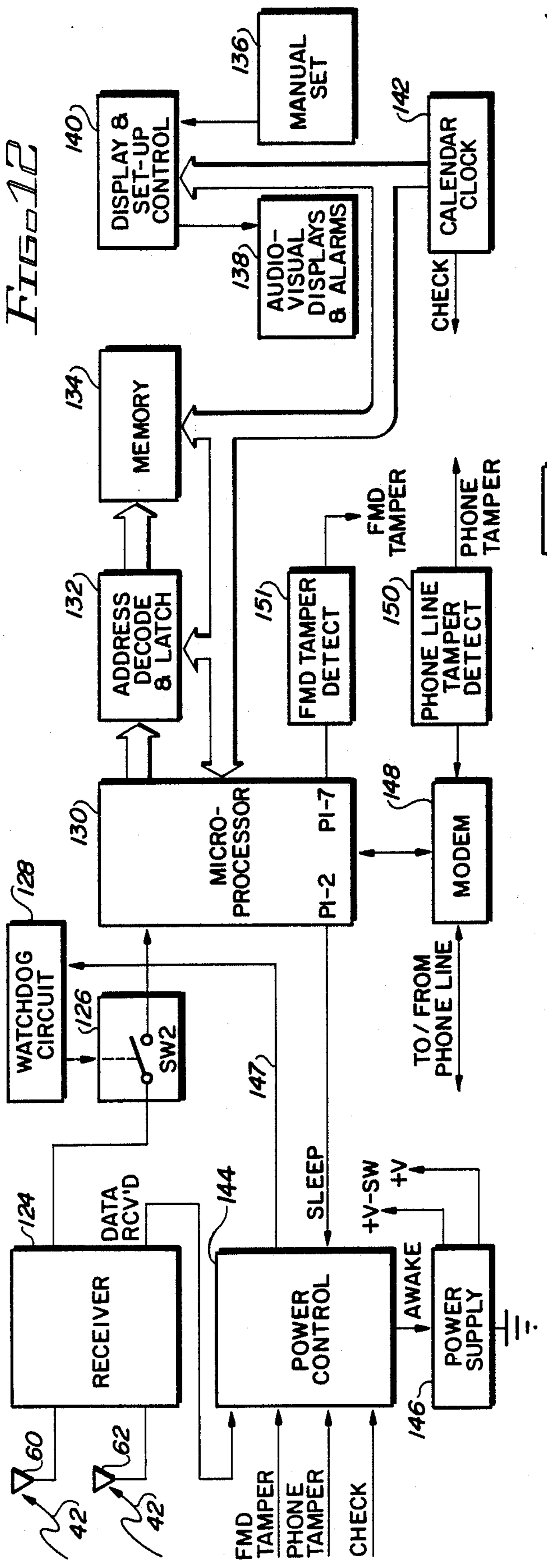
FIG. 12 is a block diagram of the FMD of FIG. 1.

FIG. 12 shows a block diagram of the FMD 40. It includes two antennnas 60 and 62 that are spaced-apart a distance that is approximately ¼ wavelength of the RF carrier signal, a distance empirically determined to be optimum for this application, although other distance may be used. As described in connection with FIG. 11, in the preferred embodiment, the RF carrier signal is approximately 303 Mhz. The wavelength of a 303 Mhz. signal is approximately one meter, or about 39 inches. Hence, in accordance with the teachings of the present invention, the antennas 60 and 62 are spaced apart about 9.8 inches.

The receiver 124 receives the signal 42, demodulates and passes the demodulated data through switch SW2 to a micropreocessor 130. Switch SW2 (also identified as block 126 in FIG. 12) is controlled by watchdog circuit 128. The purpose of the watchdog circuit 128 is to monitor the operation of the FMD, by monitoring the power control circuit 144 (described below), to ensure that the FMD operation is normal. If anything unusual occurs in the power circuits, SW2 is opened in order to prevent data from being passed to the microprocessor 130 that might be misinterpreted.

Microprocessor 130 controls the operation of the FMD in accordance with programs stored in memory 134. These progrms control the operation of the FMD so that its desired function is achieved. Address decode and latch circuitry 132 is used by the microprocessor 130 to aid in the accessing of information in memory 134. Data bus 133 allows data to be passed between the memory 134 and the microprocessor 130, as well as to the display and set-up Control circuits 140 and the calendar clock circuits 142. The display and set-up control circuits 140, in turn, interface with manual set devices 136 and audio and visual display and alarm devices 138.

Microprocessor 130 also is connected to modem 148. Modem 148 allows data to be received or sent over the telephone lines. Automatic call-up or dialing circuits are included to enable the FMD to receive or send calls.

The FMD also includes a power supply 146 that provides power to all of the circuits therein. As is explained more fully below, this power supply includes battery backup in the event that line power is lost or interrupted. In order to efficiently use the power from supply 146, especially during battery backup operation, and in order to decrease the amount of power dissipated in the FMD (thereby reducing the amount of heat generated within the unit), the power control circuit 144 advantageously operates the FMD in either a sleep state or a wake-up state. In the sleep state, most of the circuits, with the exception of the calendar clock circuits and certain other circuits that must be fully awake at all times, are essentially turned off (power is not applied thereto), thereby saving power that would otherwise be dissipated. Memory 134 is nonvolatile memory, meaning that the program instructions remain stored therein whether power is applied or not.

Four conditions cause the power control circuit 144 to switch from a sleep state to a wake-up state: (1) the reception of data by the receiver 124; (2) the detection of an FMD tamper condition as sensed by FMD tamper detect circuit 151; (3) the detection of a phone tamper condition as sensed by phone line tamper detect circuit 150; and (4) the generation of a periodic check signal by the calendar clock circuits 142. The periodic check signal is generated, in the preferred embodiment of the invention, approximately once each minute.

Figure 13A:
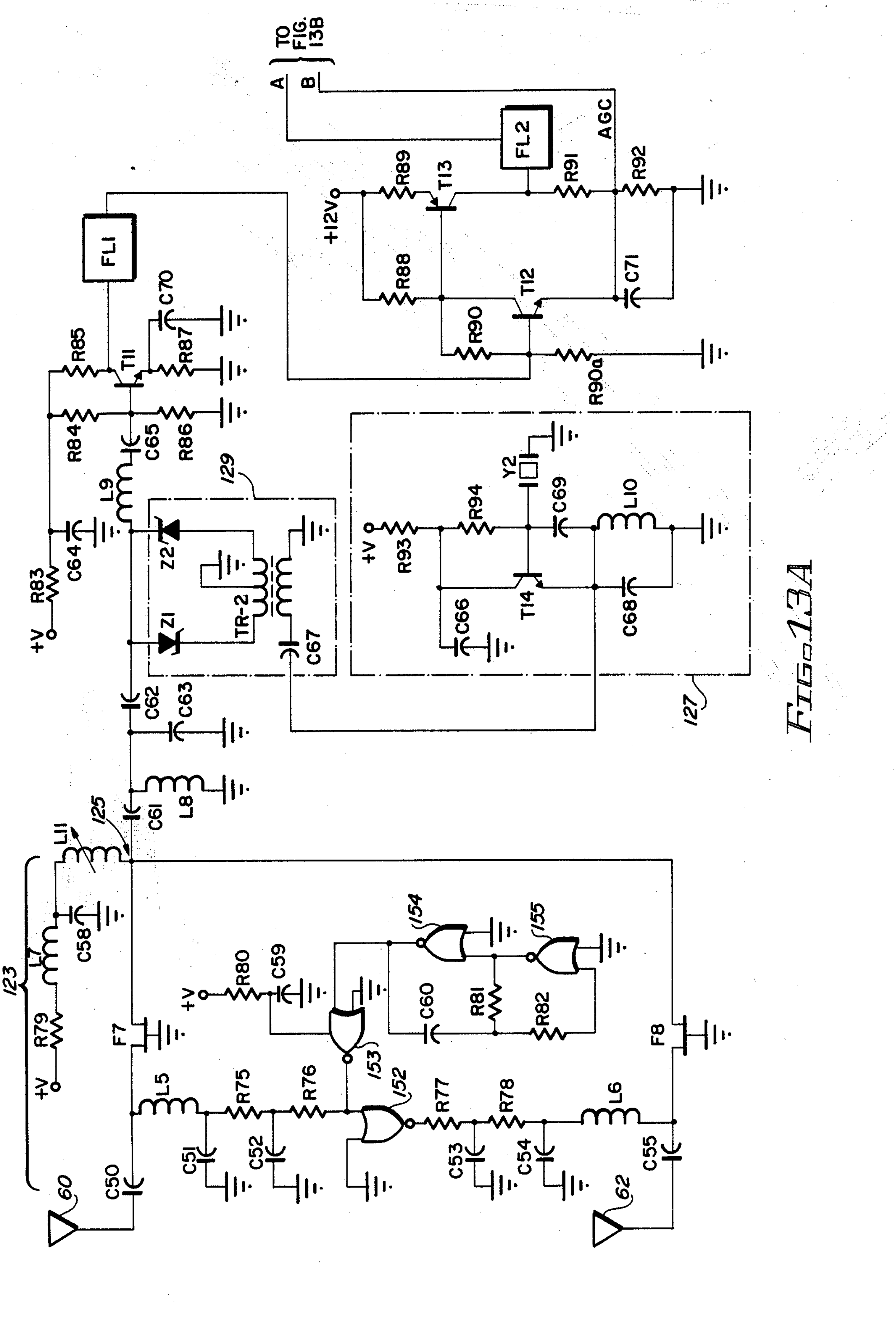
FIGS. 13A and 13B are schematic/logic diagrams of the FMD Receiver of FIG. 12A.
Figure 13B:
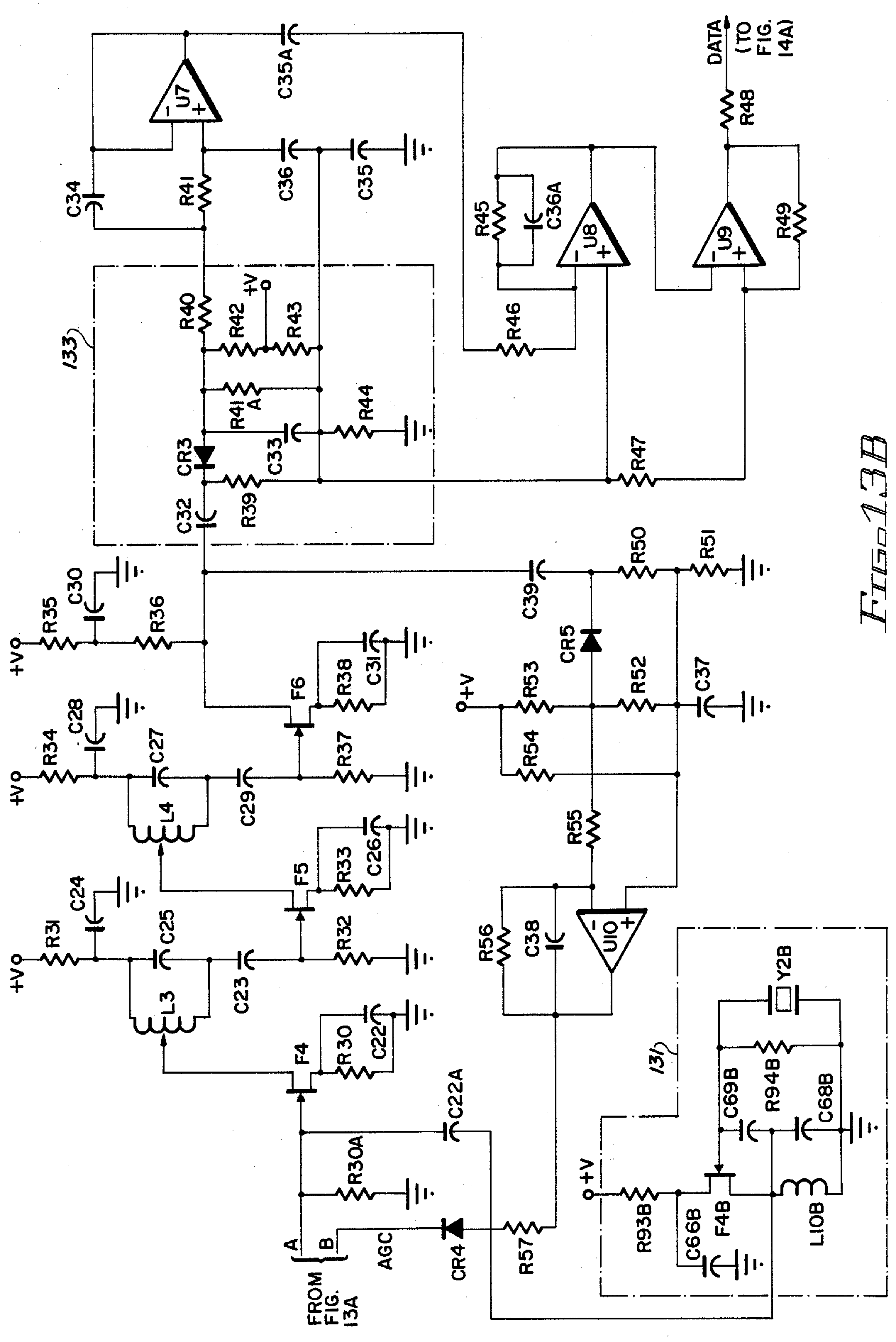

The schematic diagram of the Receiver 124 is shown in FIGS. 13A and 13B. Referring first to FIG. 13A, an electronic switching network 123 alternately connects either antenna 60 or antenna 62 to node 125. This switching network operates, in the preferred embodiment, at a frequency of approximately 5 KHz. Gates 154 and 155, and associated capacitor C60 and resistor R82, comprise the basic oscillator circuit. The oscillator signal thus generated is applied through gate 153 to transistor F7. When the output of gate 153 goes low, this signal biases transistor F7 on, thereby connecting antenna 60 to node 125. At the same time, gate 152 applies a high bias signal to transistor F8, thereby disconnecting antenna 62 from node 125. When the output of gate 153 goes high, transistor F7 is biased off, and transistor F8 is biased on, thereby connecting antenna 62 to node 125, and disconnecting antenna 60 from node 125. Thus, only one antenna, 60 or 62, is connected to node 125 at any given time. A filter network made up of series inductor L5 and resistors R75 and R76, shunted by capacitors C51 and C52, prevents the signal created by gates 152 and 153 from adversely affecting the operation of antenna 60. A similar filter network, comprised of series inductor L6 and resistors R78 and R77, shunted by capacitors C53 and C54, is used to prevent the signal created by gate 152 from adversely affecting the operation of antenna 62.

A first local oscillator (LO) circuit 127 generates a desired LO frequency. In the preferred embodiment, this LO frequency is approximately 73.3 MHz. This LO signal is mixed with the received RF signal in singly balanced mixer circuit 129, thereby producing an intermediate frequency (IF) signal that is presented to the base of transistor T11 through inductor L9 and coupling capacitor C65. Transistor T11, and its associated components, serves as a first stage IF amplifier that amplifies the IF signal and passes it on, through IF filter FL1, to a second stage IF amplifier, comprised of transistors T12 and T13, and associated components. This second stage IF amplifier includes automatic gain control (AGC) feedback applied to the emitter of T12, and to the intermediate point of the two series resistors R91 and R92 connected to the collector of T13. The output of the second stage IF amplifier appears at the collector of T13. There the signal is filtered through FL2 before being passed onto the rest of the receiver.

Referring next to FIG. 13B, the remainder of the Receiver circuit 124 is shown. The output from the second IF stage is mixed with a second LO signal in a mixer circuit that is comprised of transistor F4 and its associated components. The second LO signal is generated in a second LO circuit 131. Inductor L3 and parallel capacitor C25, connected to the source of transistor F4 function as an IF filter that allows only the desired IF signal to be passed forward to the next stage IF amplifier and filter, comprised of transistor F5 and associated components. A final IF amplifier stage, comprised of transistor F6 and associated components, amplifies and buffers the IF signal prior to presenting it to data detection circuit 133. Note that the output of the final IF stage is also presented to an AGC amplifier circuit, comprised of IC amplifier U10 and its associated components, thereby providing a mechanism whereby the amplitude of the final output IF stage can be monitored and used in a feedback loop, to control the gain of the second IF stage (FIG. 13A).

The data detection circuit 133·demodulates the IF signal presented thereto, and in conjunction with the low pass filter circuit realized with amplifier U7, U8 and their associated components, and amplifier U9, generates a data signal appearing at the output of amplifier U9 that is substantially the same as the data signal generated in the tag on signal line 110 (FIGS. 9 and 10). In the embodiment shown in FIG. 13B, amplifier U8 has a gain of about five or six. Amplifier U9 is configured to function as a Schmidt trigger, thereby serving to square up the edges of the data signal. All of the amplifiers shown in FIG. 13B can be realized using any suitable operational amplifier, such as the TL084 manufactured by Texas Instruments.

Figure 14A:
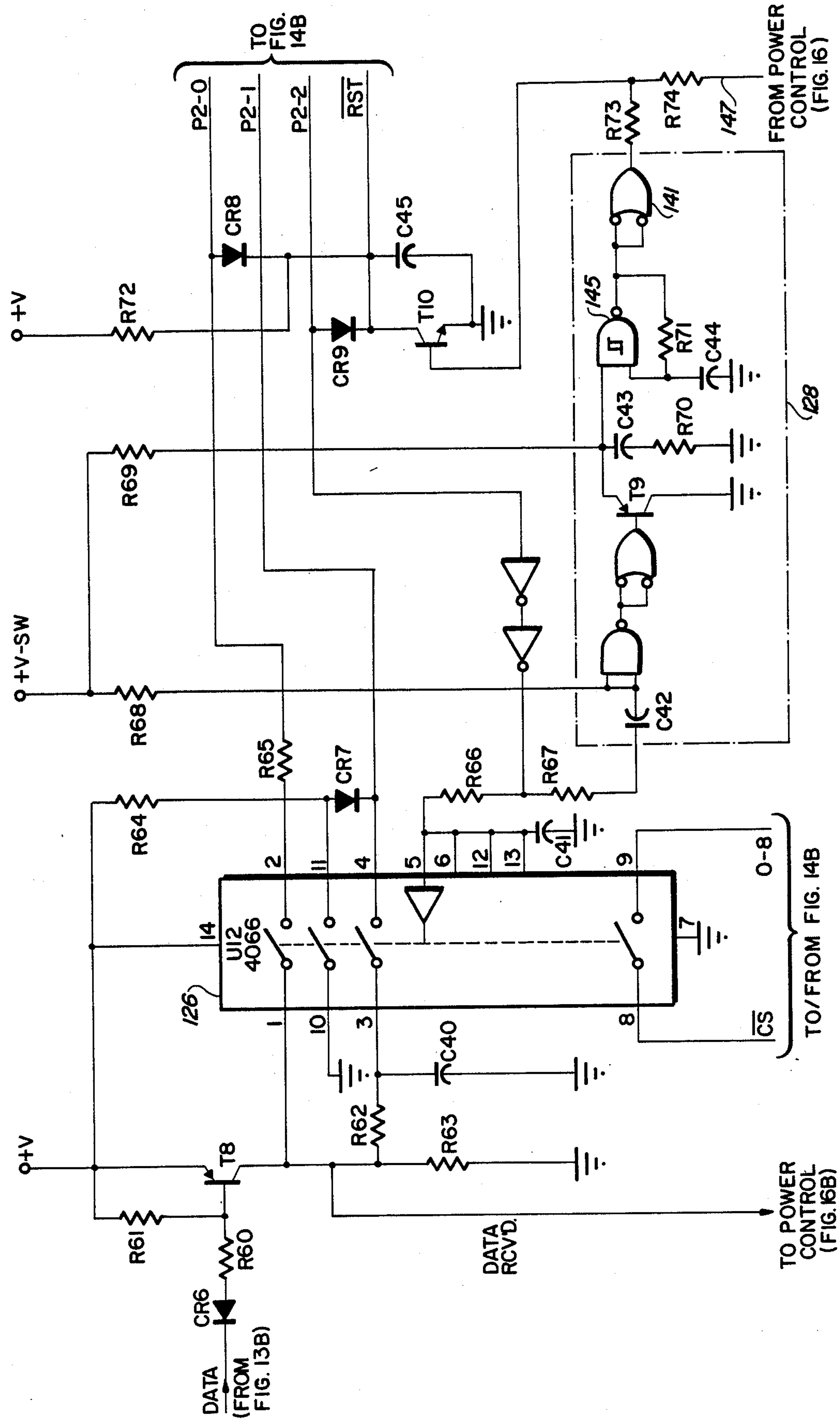
FIGS. 14A and 14B are logic diagrams of the microprocessor, memory and related circuitry to the FMD of FIG. 12A.

Data detected in Receiver 124 is passed through diode CR6 and resistor R60 and presented at the base of transistor T8, as shown in FIG. 14A. As configured in FIG. 14A, a low data signal turns T8 on, and a high data signal turns T8 off. If no data is present, the input data line remains high, and T8 remains off. Hence, the presence of any signal at the collector of T8 is transferred to the Power Control Circuit 144 (FIGS. 12 and 16), and is used to indicate the reception of data and the need to switch the FMD from a sleep state to a wake-up state. Once the presence of data has thus been detected, the processor closes the switches contained within IC switch 126 (IC U12), thereby allowing data to pass through R65 to the P2-0 terminal of the microprocessor 130 (best shown in FIG. 14B). Note that there are several switches contained within IC switch U12, only one of which (between pins 1 and 2) is used to switch data as described above. The other switches are used to perform various other functions used during the initalization (entering the wake-up state) of the FMD. For example, the switch between pins 3 and 4 directs a signal to pin P2-1 of the microprocessor 130 that is initially high but that goes low whenever a data burst is present at a rate defined by the time constant of R62 and C40. Diode CR7, and the switch between pins 10 and 11, assure that this line is initially high.

Watchdog circuit 128 pulls data line P2-0 low through diode CR8 whenever transistor T10 is turned on by the output of gate 141 going high. T10 may also be turned on by the application of a high signal from the power control circuit through resistor R74. This action also pulls line P2-2 low, which causes the switches in U12 to open.

The output of gate 141 goes high whenever capacitor C43 charges above the turn-on threshold of gate 145. When power is first applied to the watchdog circuit 128, C43 has been discharged through transistor T9, which is momentarily turned on. The charging path for C43 is through R69. By selecting the values of C43 and R69, therefore, the time that the watchdog circuit 128 allows data to pass through to the microprocessor 130 can be controlled. In the preferred embodiment, this time is selected to be one or two seconds, more than adequate time for the desired data word to be received by the microprocessor.

Figure 14B:
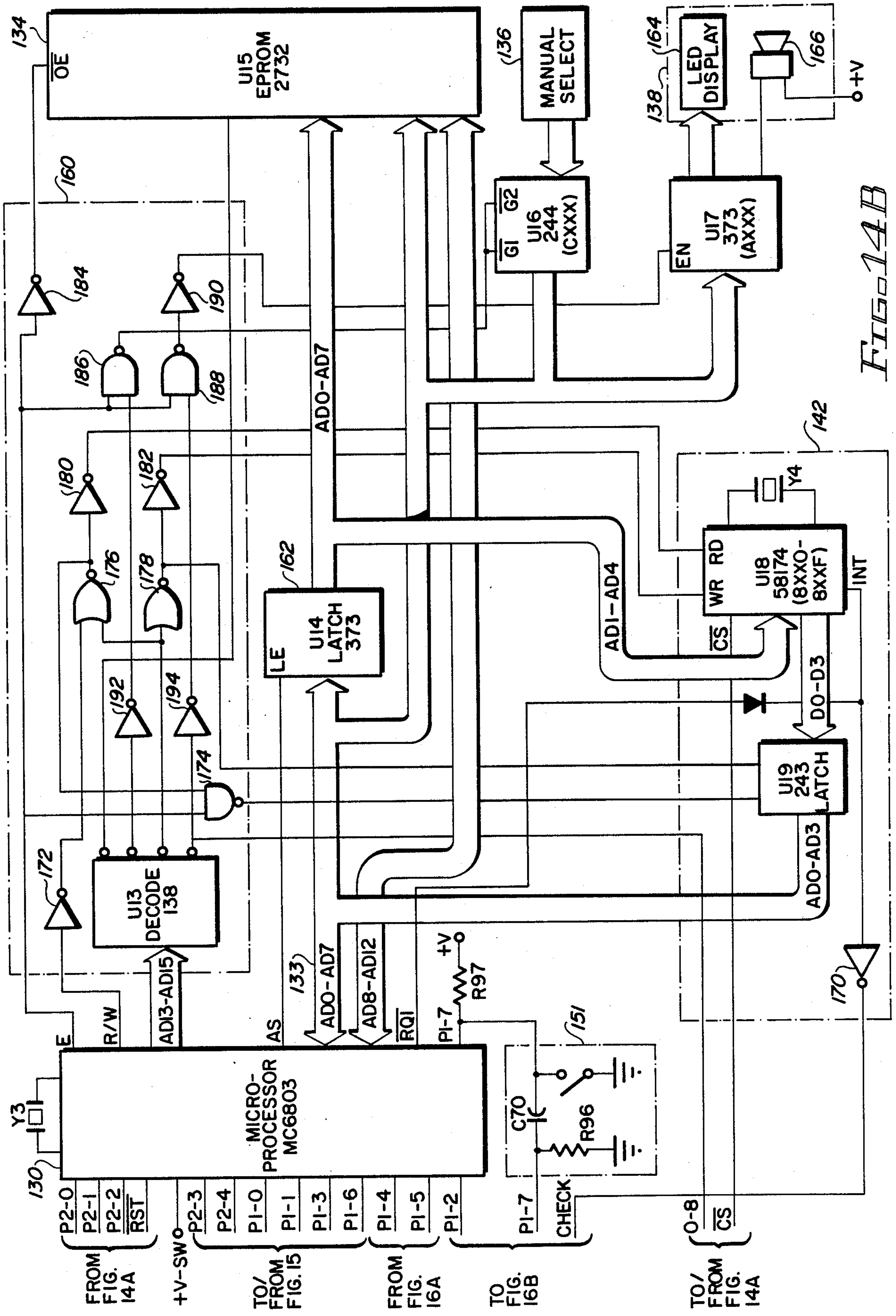

In FIG. 14B, a simplified logic diagram of the microprocessor, memory, and calendar clock circuits is shown. The use of these components is more or less conventional, and a detailed explanation of their operation will not be presented herein. Such detailed explanations are available in the microprocessor literature.

In general, microprocessor 130 is realized in the preferred embodiment with an MC6803, an 8-bit processor commercially available from Motorola. EPROM U15 is used to realize the memory 134 in which the controlling programs of the microprocessor are stored, and wherein additional data may be written. The microprocessor 130 also has a RAM internal thereto used for the temporary storage of data and instructions. Decode circuit U13 and latch circuits U14, U16, U17 and U19 may all be realized with commercially available IC's identified by the generic numbers HC138, HC373, HC373, HC244, and HC243, respectively. The manual select circuitry 136 comprises an array of switches, mounted inside of the FMD's cabinet so as not to be accessible to anyone other than authorized personnel. The LED Display 164 comprises an array of LED's that are selectively turned on as a function of the state of the latches within U17. Similarly, audio alarm 166 comprises any suitable alarm, and driving circuit, that is enabled by the state of one or more latches within U17. In the preferred embodiment, this alarm is a beep alarm of the same type commonly found in calculators and digital watches.

In operation, the microprocessor 130 remains in a sleep state (no power applied thereto) unless one of the four conditions previously desribed occurs. Upon the occurrence of one of these events, the microprocessor enters a wake-up state and performs those functions specified by the program stored in the memory 134. The actual program that is carried out by the microprocessor is dependent upon which of the four conditions triggered the wake-up state. That is, a different routine is initialized if a tamper condition is detected than is initialized if data is detected or if a periodic check condition exists. As soon as the desired program has been completed, the microprocessor signals this fact to power control circuit over signal line P1-2, which signaling causes the FMD to revert back to the sleep state.

The calendar clock 142 keeps track of the actual time which is used for logging of data. A standard time/date IC, such as the 58174, can be used to realize this function. This unit employs its own crystal Y4 in order to accurately mark time.

Figure 15:
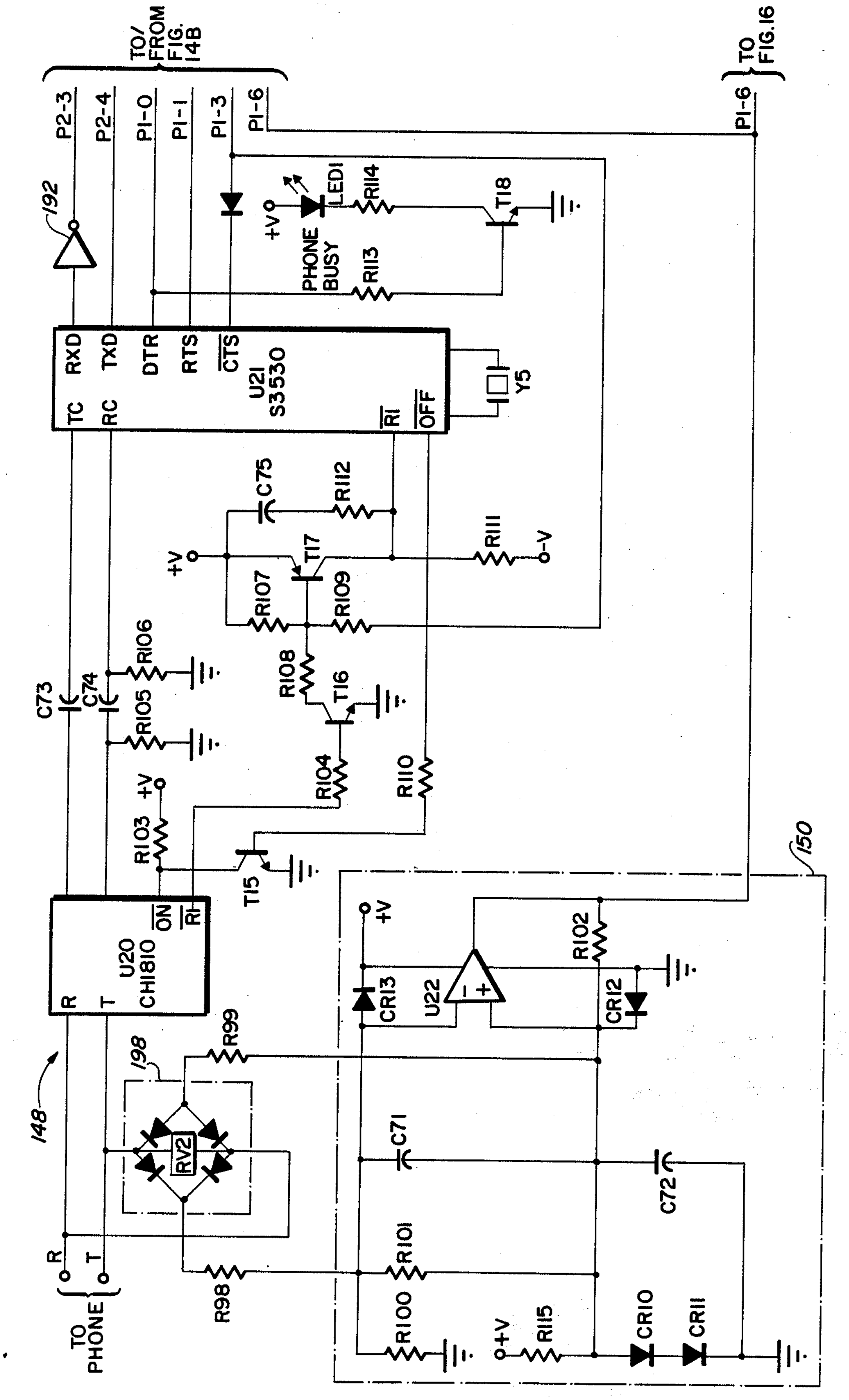
FIG. 15 is a schematic/logic diagram of the Modem and Phone Line Tamper Detect circuit of FIG. 12A.

Referring next to FIG. 15, a simplified logic/-schematic diagram of the telephone interface 148 and phone line tamper detect circuit 150 is illustrated. IC U21 is a modem ciruit that serves the function of filtering and modulation/demodulation, i.e., converting the tones transmitted through a telephone line to or from appropriate digital signals that are received from or processed by the microprocessor 130. As noted in FIG. 15, device U21 may be realized with a S3530 device, commercially available from AMI. Device U21 is connected to IC U20, a telephone interface circuit that contains the necessary isolation and protection between the phone lines and the modem. In addition, it contains circuitry to detect ringing and to allow the modem to go OFF and ON HOOK.

The discrete circuitry located between U20 and U21 serves to couple certain signals from one device to the other, and to provide appropriate status signals to the microprocessor 130. For example, transistor T15 operates as an inverter to couple the OFF HOOK signal from U21 to the ON HOOK signal of U20. Similarly, transistor T16 inverts the R1* (inverse of R1) signal of device U20, and provides an R1 status signal for delivery to the P1-3 terminal of the microprocessor 130. Transistor T17 then inverts this R1 signal again, and translates its range to extend from +V to −V volts, and provides this translated R1* signal to U21.

Transistor T18, and LED1 connected to the collector thereof in series with current limiting resistor R114, provides a visual indication of when the phone line is busy, as sensed by signal line DTR going high.

The phone line tamper detect circuit 150 looks for the presence of a voltage on the R and T phone lines through resistors R98 and R99, and the corresponding diodes that form the bridge circuit 198. These signals are then coupled to the "+" and "−" terminals, respectively, of amplifier U22. Diodes CR10 and CR11 provide a positive reference voltage for the "+" terminal of U22. In operation, this circuit detects the presence of some voltage on the phone lines. If the phone cord is disconnected, such as if cut, this voltage is not present and the output level of U22 will be altered. Bridge circuit 198 includes surge protection device RV2 that advantageously provides lightning protection for the ciruit 150.

Figure 16A:
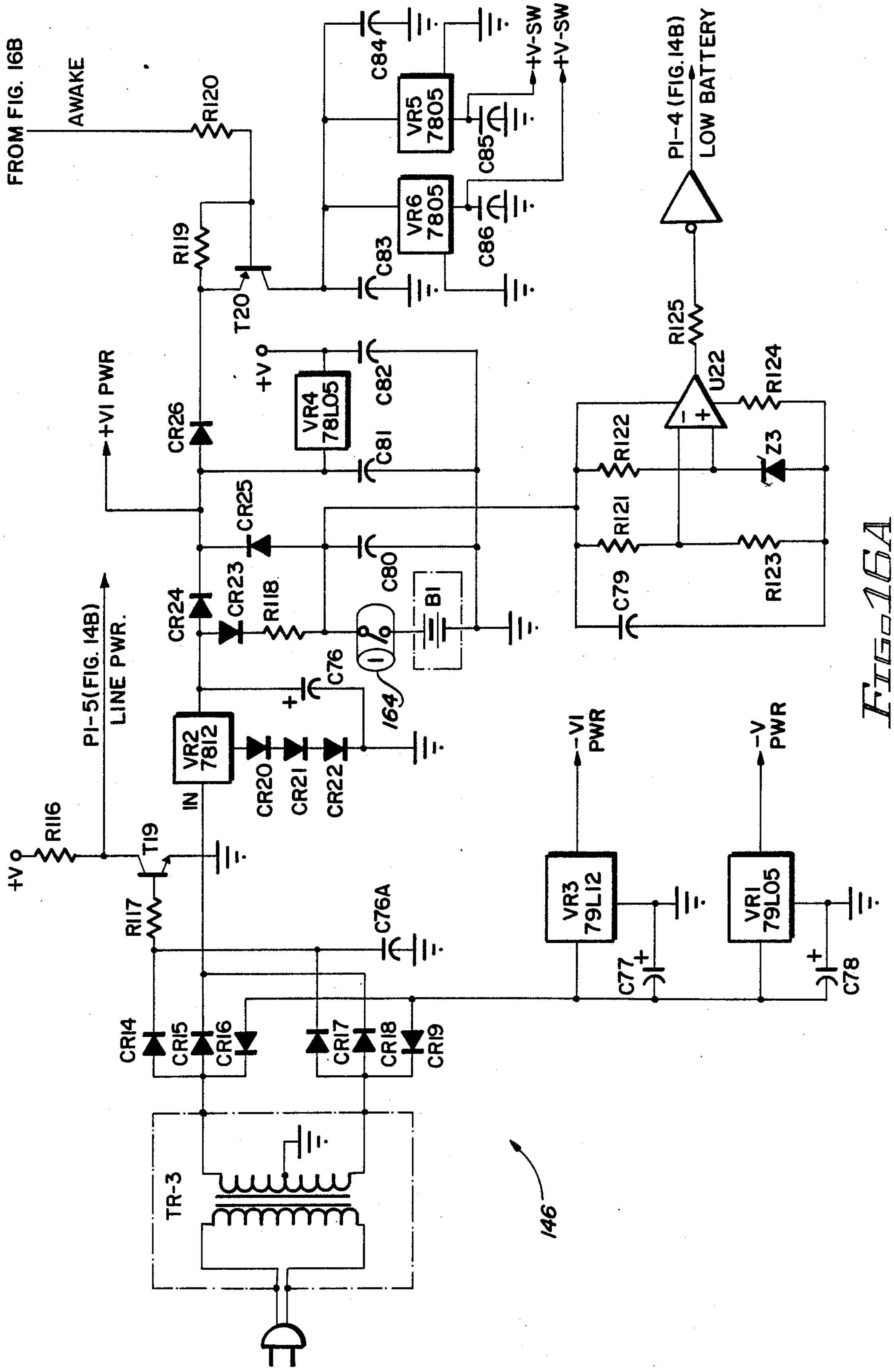
FIGS. 16A and 16B are schematic/logic diagrams of the Power Supply and Power Control circuit of FIG. 12A.

Referring next to FIG. 16A, a schematic diagram of the FMD power supply 146 is shown. The design and configuration of the power supply 146 is more or less conventional, except as noted below. Both positive and negative voltages are produced by the supply, designated as +V1, −V1, +V, and −V. A switched voltage is also generated, designated as "+V−SW".

The input side of the power supply is conventional. Transformer TR-3 steps down the primary voltage to suitable working voltages for the secondary circuits. Rectifier diodes CR14–CR19 provide full-wave rectification of the signal developed in the center-tapped secondary winding. Capacitor C76A provides initial filtering for this rectified signal. Transistor T19, driven by the full wave rectified and filtered signal, provides a LINE PWR signal to the microprocessor 130 (FIG. 14B) that is low for so long as the rectified signal is present.

IC's VR1–VR6 are voltage regulator circuits that generate the desired voltages from the 14 volt supply. These devices, in accordance with the preferred embodiment, are identified in the Figure by their commercially available device numbers, e.g., VR2 is a 7812, VR1 is a 79L05, VR3 is a 79L12, VR4 is a 78L05, VR5 is a 7805, and VR6 is a 7805. The last two digits of these device numbers indicate the regulated voltage that is developed; hence, for the emobodiment shown, both positive and negative twelve and five volt potentials are provided.

Included in the power supply circuit 146 is a battery B1. This battery B1 is switchably connected in parallel with the output of VR2, through diode CR25, by key switch 164. Use of switch 164 allows B1 to be totally out of the circuit until such time as installation of the FMD occurs, thereby maintaining the shelf life of battery B1.

Figure 16B:
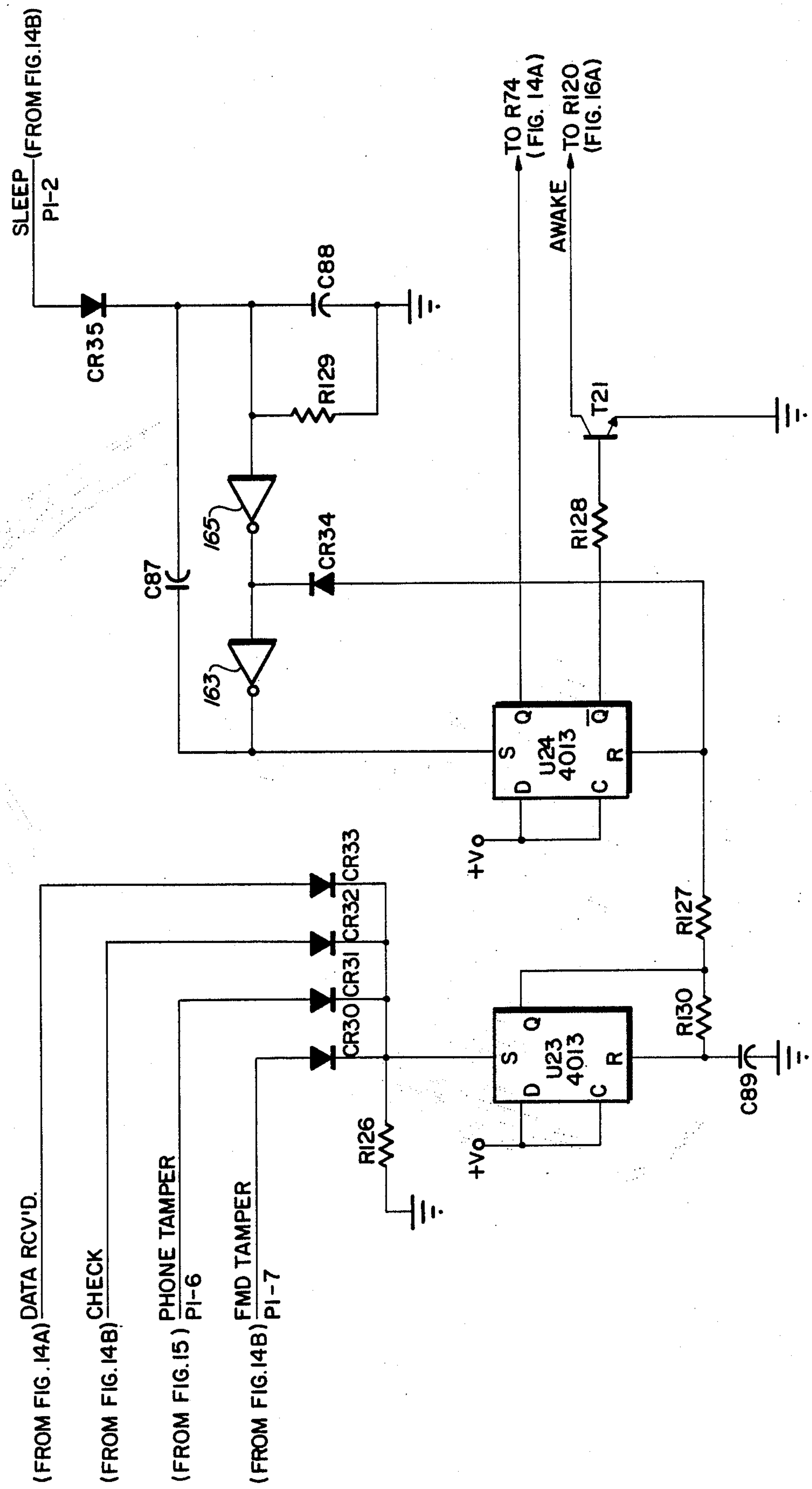

Transistor T20, realized with a 2N6124 transistor, switchably connects the output of VR2, as delivered through diode CR26, to the voltage regulators VR5 and VR6 whenever an AWAKE signal is received from the power control circuit 144 (FIG. 16B). Thus, the regulators VR5 and VR6 are only activated during the Awake mode of operation. The outputs of these regulators are identified as switched voltages +V−SW. This switched voltage is delivered to most of the circuits of the FMD. That is, as explained previously, most of the circuits of the FMD are not powered except during the Wake-Up state (also referred to as the AWAKE mode). This conserves a significant amount of power inasmuch as the AWAKE mode typically comprises a very small portion of the total time the FMD device is used.

The battery B1 is monitored by a low battery detect circuit made up of comparator circuit U22 and its associated components. A suitable reference voltage is generated by zener diode Z3 and applied to the "+" input of U22. A signal obtained by dividing down the battery voltage through a resistive divider network made up of resistors R121 and R123 is fed into the "−" input of U22. Whenever the battery voltage signal (which is proportional to the actual battery voltage) drops below the reference voltage, the circuit U22 changes state, thereby signalling the microprocessor that the battery voltage is low. This message is ultimately transmitted to the Central Processing Unit and included in a status report, thereby alerting maintenance personnel that the battery needs to be recharged or replaced.

In the preferred embodiment, the battery B1 is realized with a lead-acid gell-cell 12 volt battery manufactured by Yuasa.

Referring next to FIG. 16B, a schematic diagram of the the power control circuit 144 is shown. The occurrence of any of the four conditions shown—(1) detection of data, (2) a periodic check, (3) detection of a phone tamper, or (4) detection of an FMD tamper—causes flip/flop U23 to be set. This action, in turn, causes flip/flop U24 to be reset. With flip/flop U24 in a reset state, its Q output is low, thereby keeping transistor T10 off (FIG. 14A), and its Q* output is high, thereby turning transistor T21, coupled to the Q* output through resistor R128, on. Turning on T21 causes T20 (FIG. 16A) to also be turned on, which action causes the regulators VR5 and VR6 to receive power, thereby providing the "+V−SW" power that enables the AWAKE mode of operation of the FMD. This AWAKE mode of operation continues until a SLEEP signal is received through diode CR35 from the P1-2 terminal of the microprocessor 130. This SLEEP signal causes U24 to be set, thereby disabling the AWAKE mode and causing the SLEEP state to be initiated. Note that flip/flop U23 is reset a short time after it is set by the charging of capacitor C89 through resistor R130. As an aid to further understanding the best mode of operating the FMD, FIGS. 19 through 23 are flow charts that illustrate some of the routines performed by the microprocessor-based device. These flow charts are believed to be self-explanatory, and should provide an adequate basis to enable those skilled in the art to practice the invention described herein without undue experimentation.

The Repeater

Figure 17:
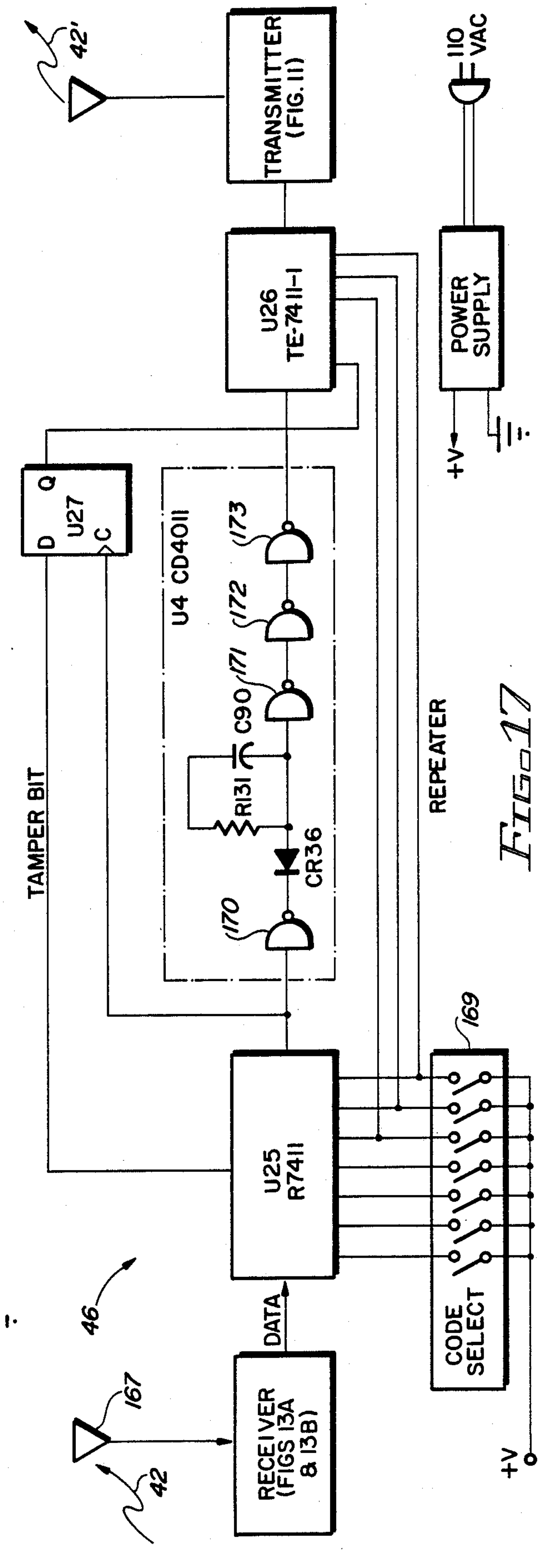
FIG. 17 is a schematic/logic diagram of the Repeater of FIG. 1.

As explained briefly above in connection with FIG. 1, the use of a repeater circuit 46 may sometimes be required in order to assure that the identification signal 42 is received by the FMD 40 regardless of the location of the tag 44 within the area 32 being monitored. A simplified diagram of the repeater circuit 46 is shown in FIG. 17. This circuit includes a receiver circuit 175 that is substantially identical to the receiver circuit described in connection with FIGS. 13A and 13B. The output of the receiver circuit is thus a data word that is equivalent to the data word generated in the tag 44 and appearing on signal line 110 (FIGS. 9 and 10) of the tag. The data word received in the repeater's receiver circuit 175 is applied to comparison circuit U25. The circuit U25 includes a shift register wherein the data word is stored. The individual bits of the word are compared with a preset sequence of bits as defined by switch 169. Thus, switch 169 is preset to correspond to the identification code of the particular tag that is being monitored as set by the code select device 86 of the tag (FIG. 9). If all of the prescribed bits of the received word correspond to the bits of the switch 169, then U25 outputs the data word stored therein to gate 170. Gate 170, in combination with diode CR36, R131, C90, and gates 171, 172, and 173, functions as a pulse generator that generates a pulse on the trailing edge of each bit signal. The pulse thus generated is used as a clock signal to clock a data word signal out of device U25 to the transmitter circuit that is substantially identical to the transmitter ciruit described in conjunction with FIG. 11. The data word that is generated by device U26 is set the same as switch 169.

Thus, in operation, the repeater circuit receives the identification signal 42, stores it for a short time (3 seconds), verifies that the signal it has received is a proper signal, and then retransmits it. In the figures, the retransmitted signal is identified as 42'.

As explained previously, one of the bits of the identification signal is a tamper bit, used to indicate whether an attempt to remove the tag 44 from its wearer has been detected. The repeater circuit 46, after verifying that the identification bits are correct, passes this tamper bit to flip/flop U27, where it made available to encoder U26 for insertion back into the new data word 42' that is transmitted after a short delay.

Figure 18:
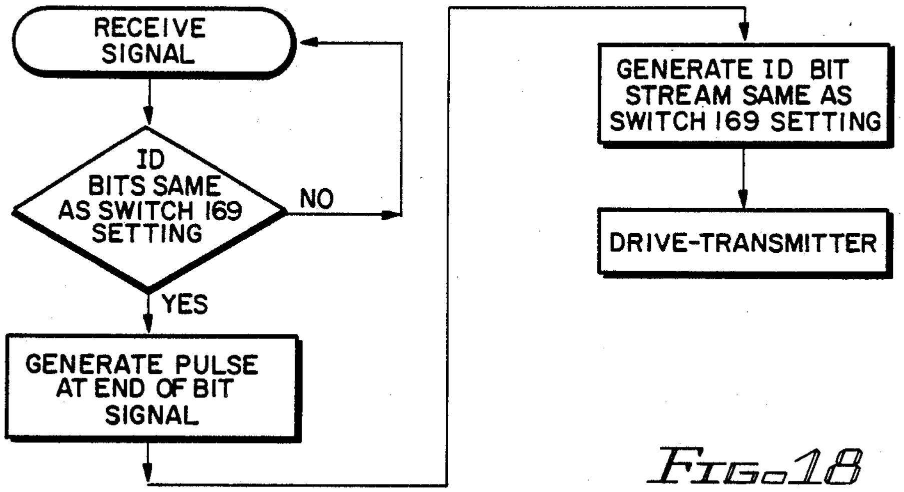
FIG. 18 is a flow chart illustrating the operation of the Repeater of FIG. 17.
Figure 19A:
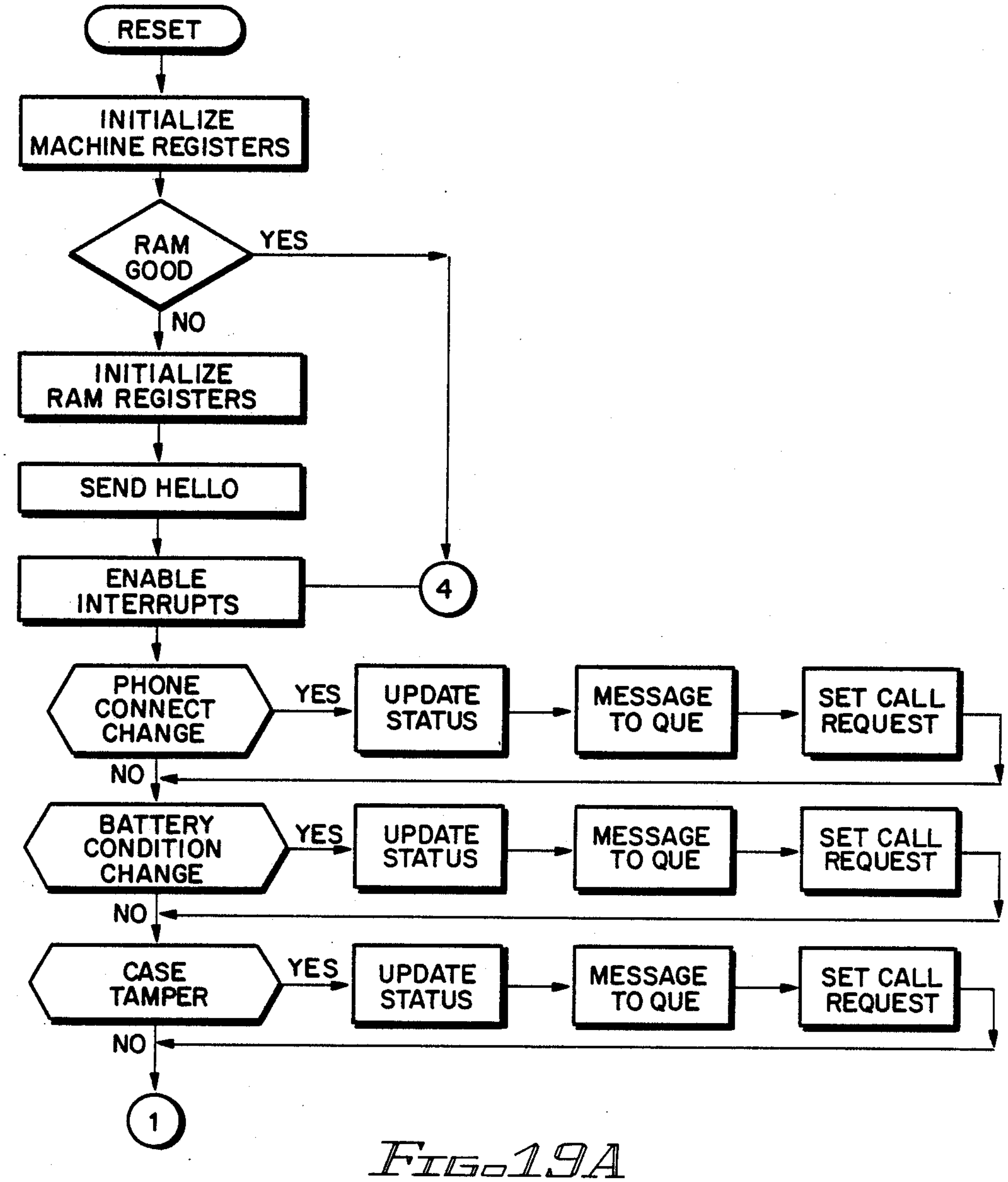
FIGS. 19–23 are flow charts illustrating the basic operation of the FMD of FIG. 12A, including the main monitoring routine followed by the FMD (FIGS. 19A–19D), the phone transmit interrupt routine (FIGS. 20A–20E), and several key subroutines, such as the subroutine for queueing a messge (FIG. 21), the subroutine to fetch real time (FIG. 22), and the subroutine to transmit by phone (FIGS. 23A–23B)
Figure 19B:
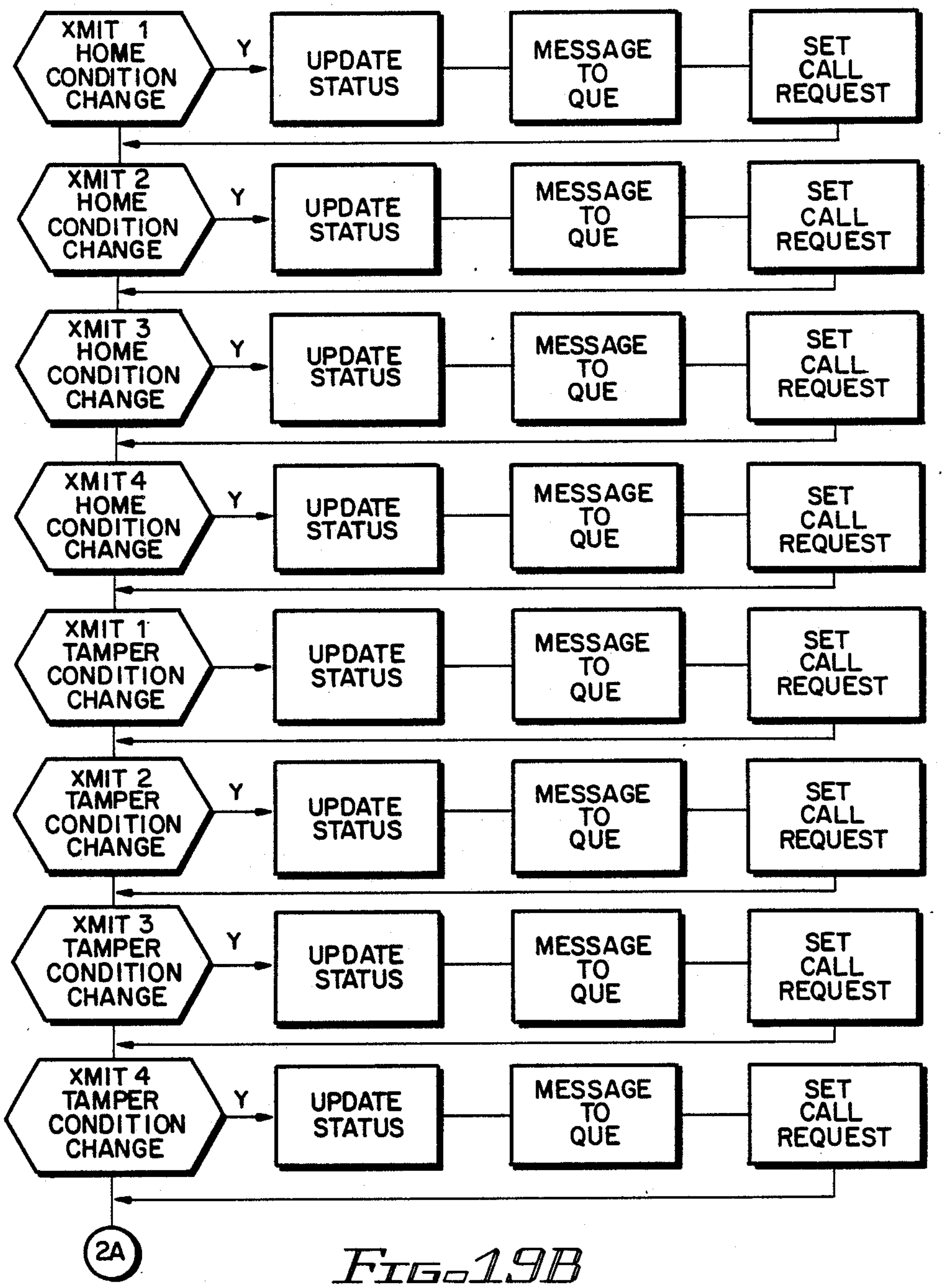
Figure 20A:
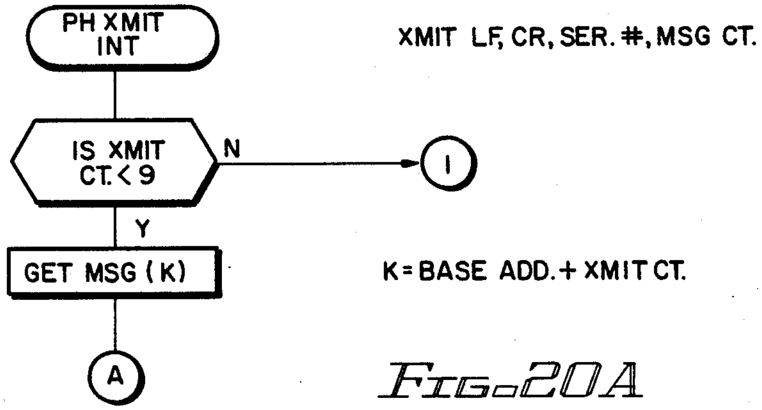
Figure 19C:
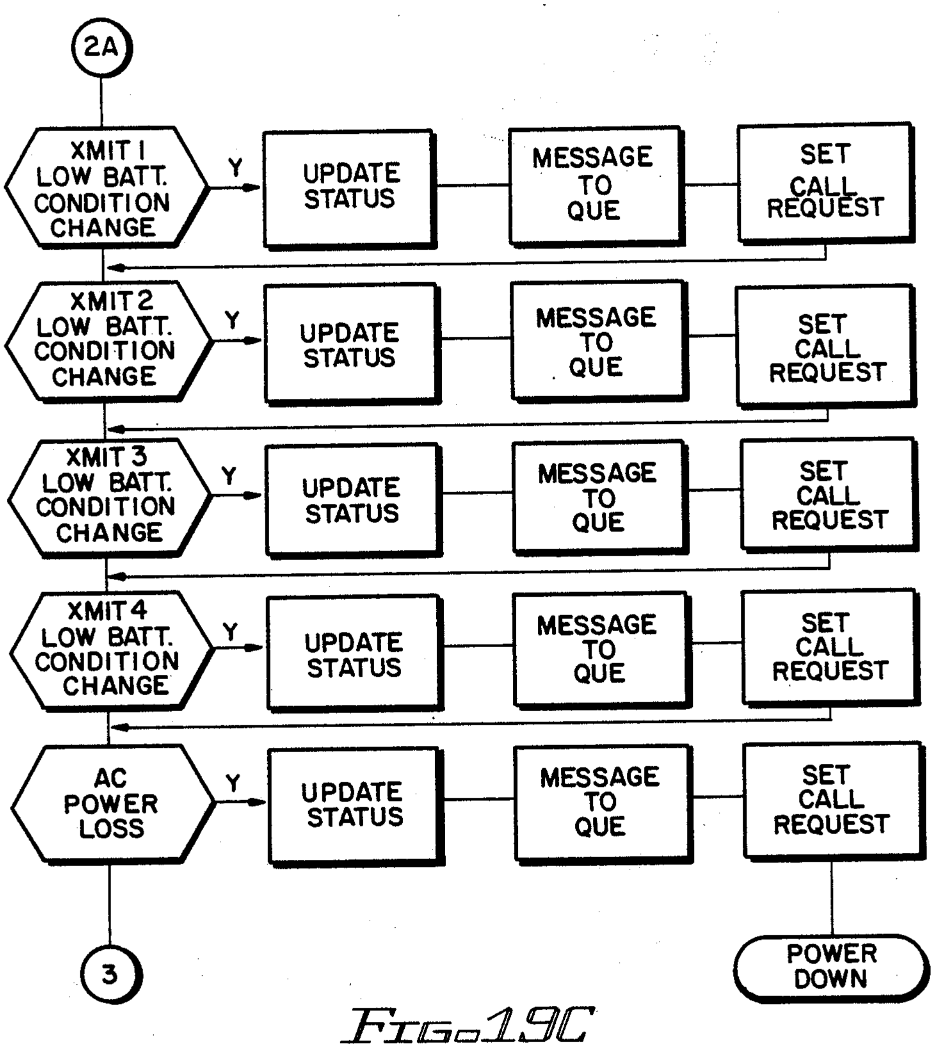
Figure 20B:
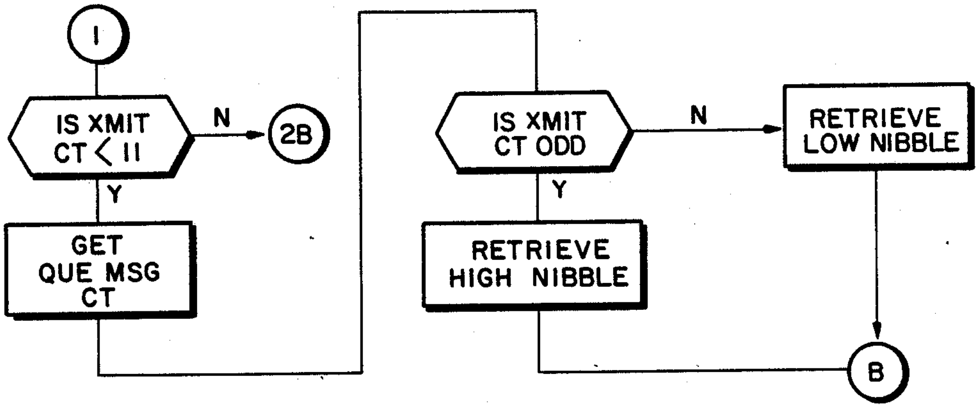
Figure 19D:
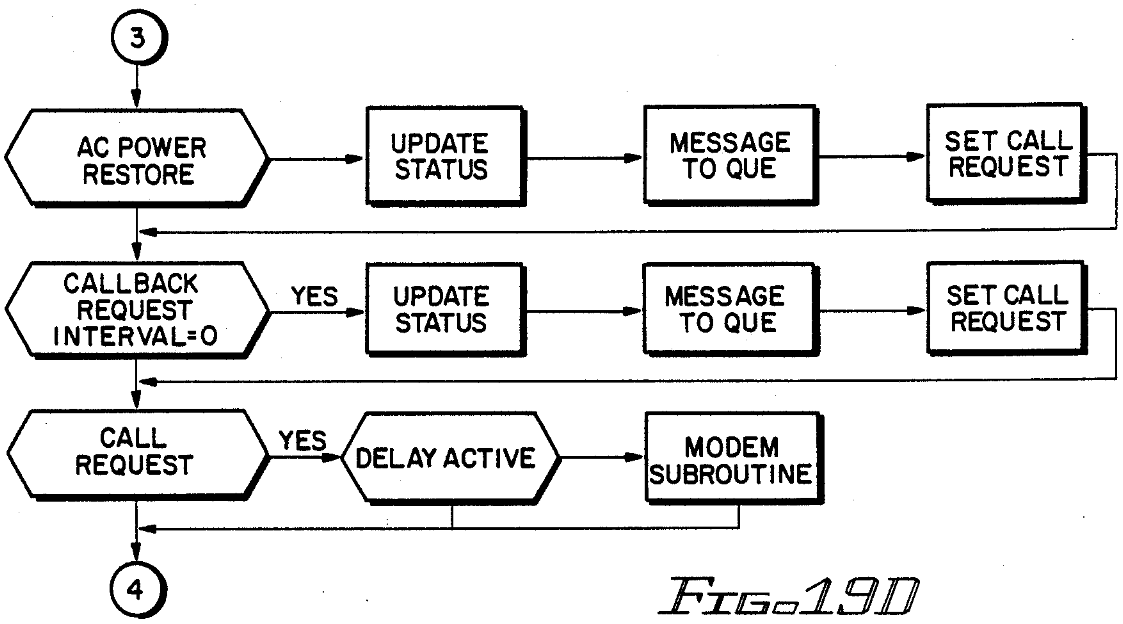
Figure 20C:
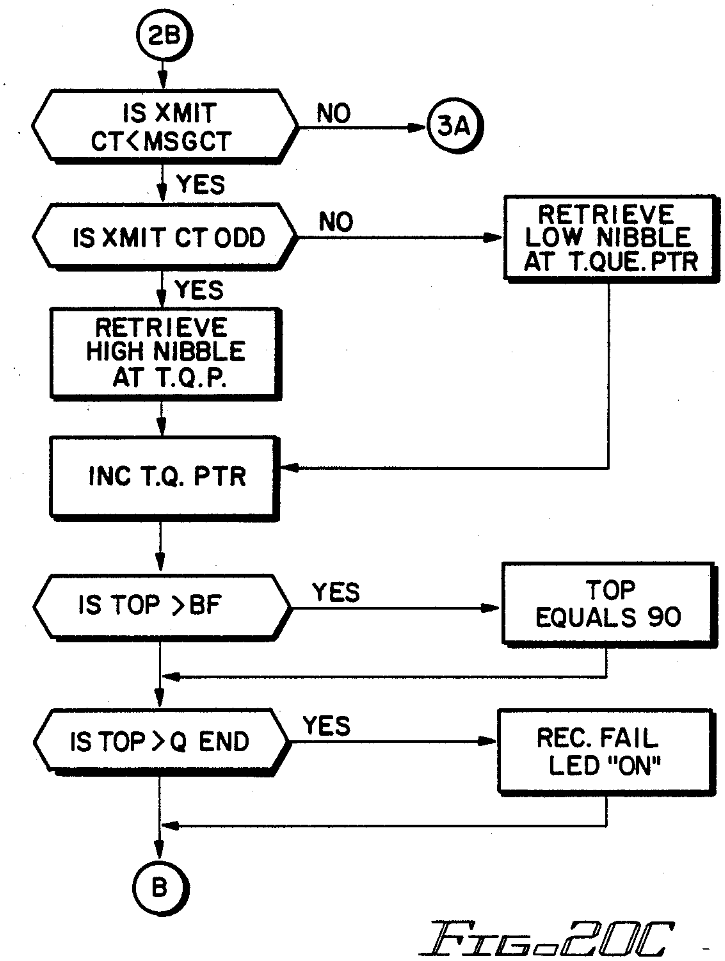
Figure 21:
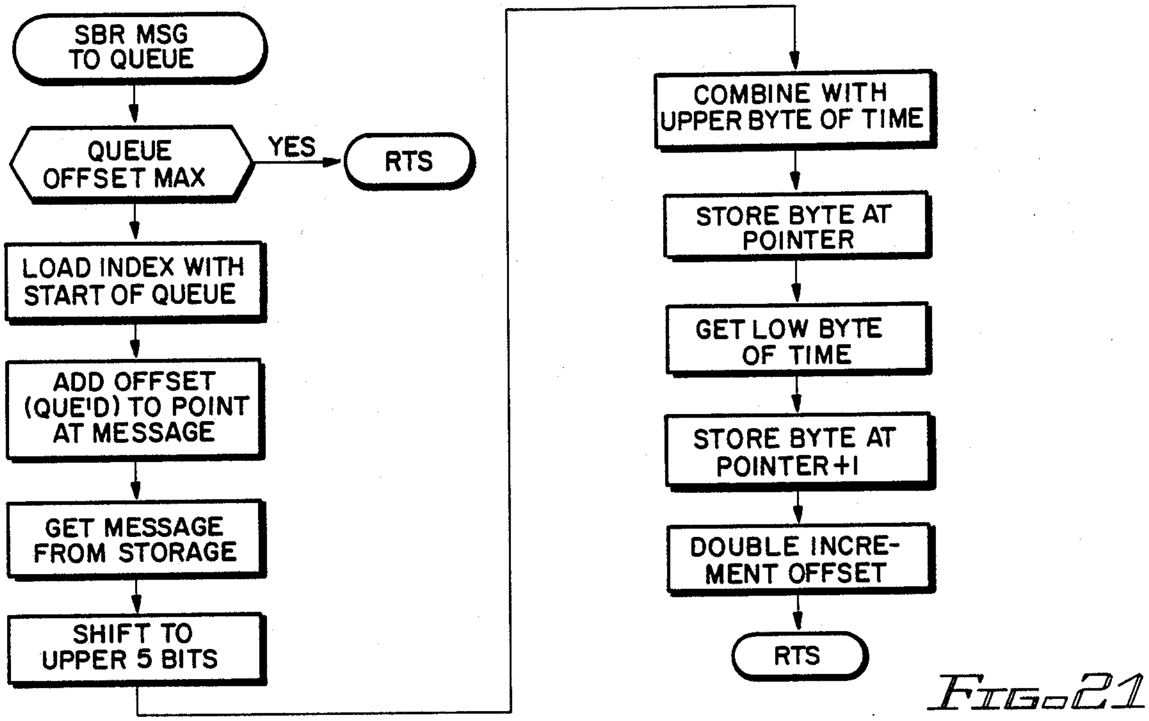
Figure 20D:
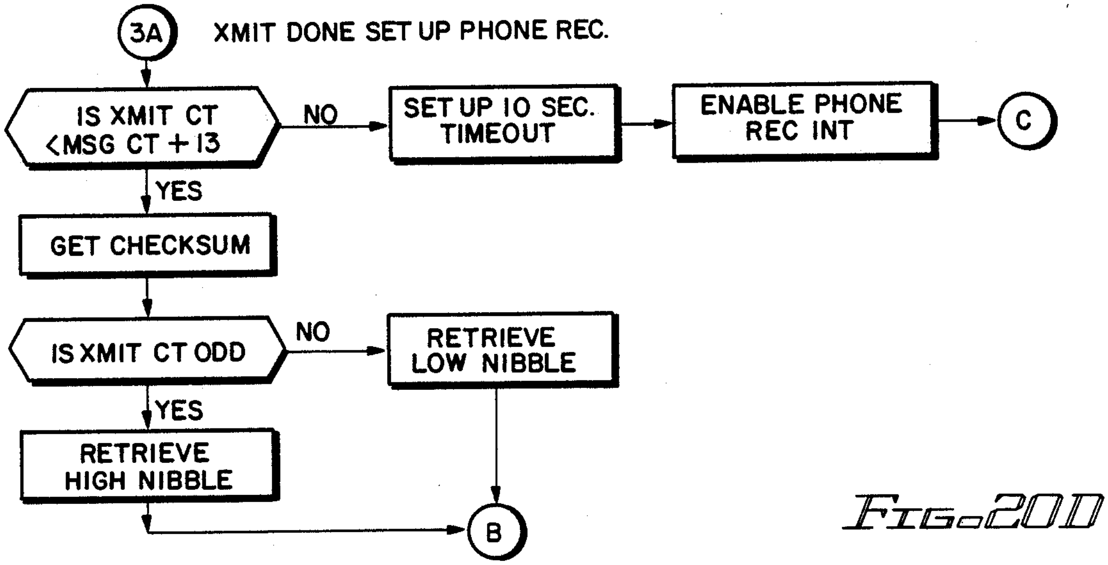
Figure 23B:
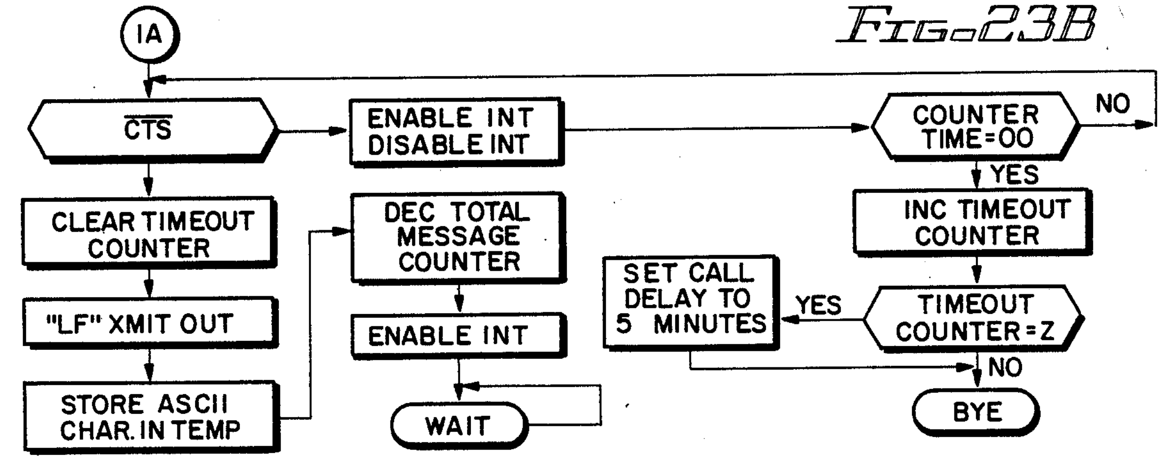
Figure 20E:
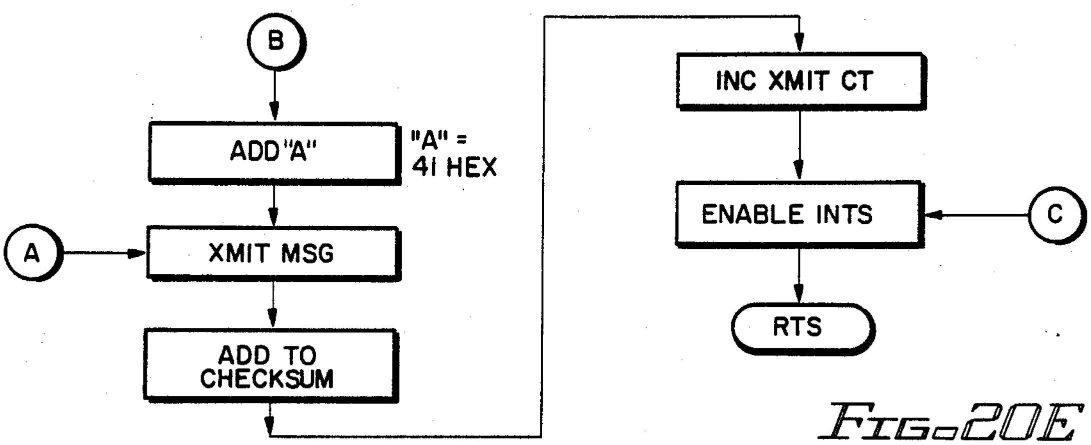
Figure 22:
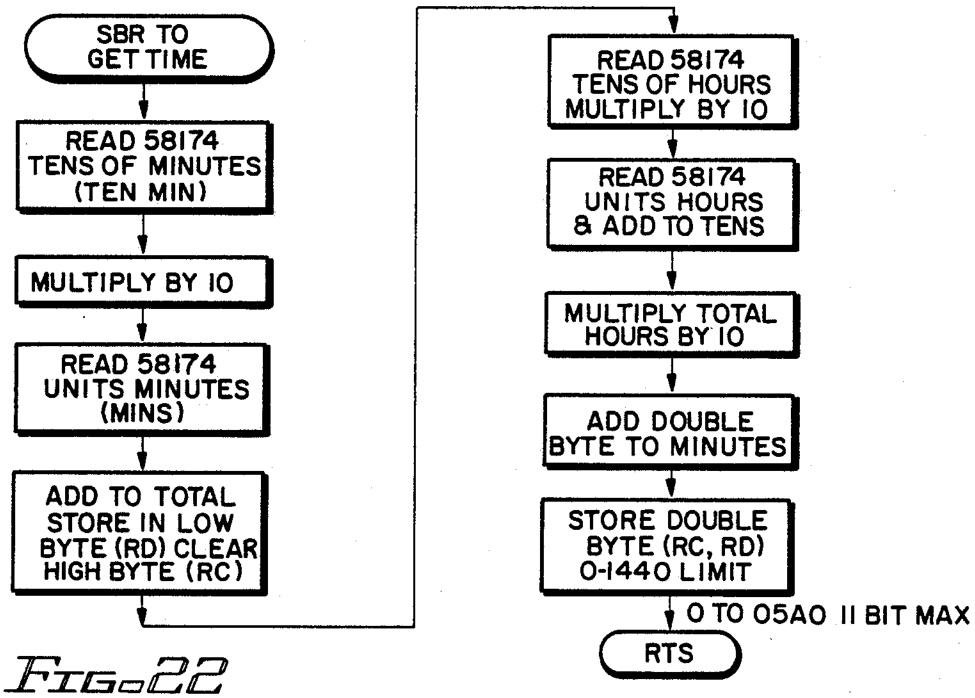
Figure 23A:
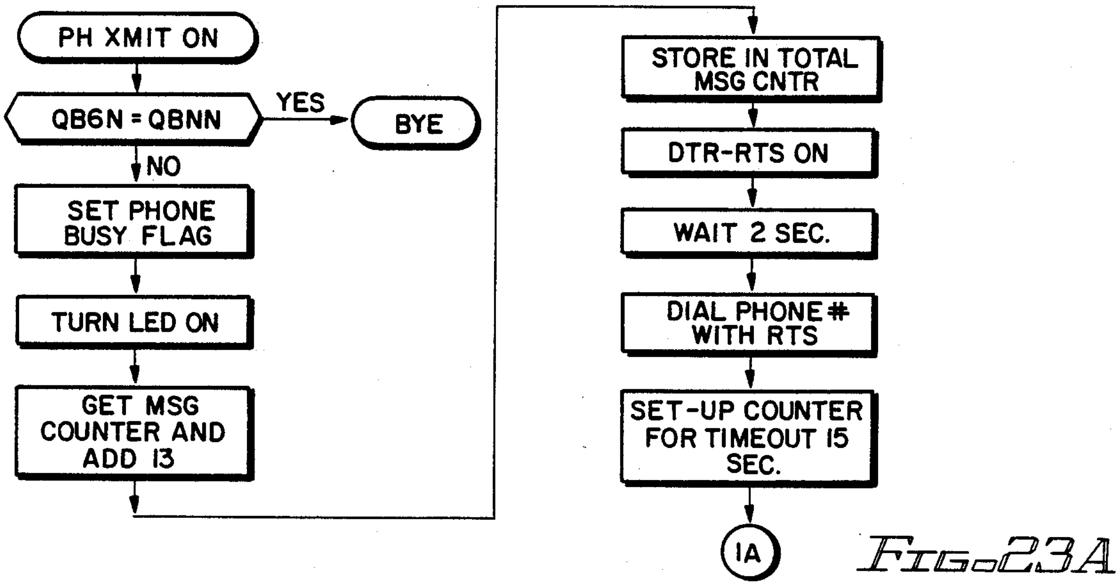

FIG. 18 is a flow chart that illustrates the operation of the repeater circuit 46 of FIG. 17. As emphasized therein, a match must be made between the received identification bits and the bits defined by the setting of switch 169 before a new identification bit stream is generated. This new bit stream has bits therein as defined by switch 169.

The Central Processing Unit (CPU)

Another component of the house arrest monitoring system, as discussed briefly in connection with FIG. 1, is the host computer or CPU 34. This CPU 34 is a multitasking, multi-user machine capable of interfacing with a large number of FMD's. In the preferred embodiment, it is capable of interfacing with 200 FMD's at 200 different locations. It further includes at least a 40 megabyte hard disk 34.1 for data storage, a terminal 48 having a CRT screen or equivalent for visual display, and a printer 50 having the capability of printing at least eighty columns. While numerous different types of host computers could be used for the CPU 34, in the preferred embodiment an NCR TOWER XP CPU is employed that utilizes a UNIX System V operating system.

The host CPU 34 is loaded with an integrated applications software package that allows agency personnel to add, change, delete, and retrieve information concerning the monitored individuals. This applications software is divided into two components: (1) ADM, an applications system that performs the administrative control functions of starting, stopping, and interactively assigning specific tasks; and (2) UNIFY, a database manager system that allows new individuals to be placed under monitor, old individuals to be removed from monitor, and all information to be made available for reporting.

The primary responsibility of the host CPU 34 is, of course, to effectively monitor each FMD at its respective remote location and to provide the information thus learned to agency personnel in a timely and understandable format. To this end, those skilled in the art could devise numerous types of software programs that would achieve this purpose, each in a slightly different way in accordance with the personal preferences of the programmer and the requirements and limitations of the particular CPU that is employed. In general, the main requirements of the CPU 34 are that it be able to initiate and receive telephone calls from the FMD's and safely archive the information received to a fixed mass storage device (34.1). A further requirement is that all the data thus stored be readily available to agency personnel in easy to understand formats and displays.

What follows is a brief description of the best mode for practicing the invention at the host CPU level. It is to be understood that numerous variations and modifications could be made to this approach without departing from the spirit and scope of the invention.

In general, the integrated applications software that is used comprises a collection of programs and system utilities that are collectively known as the MONITOR system. The MONITOR system is controlled by the host CPU operating system. Programs which run for an indefinite time are referred to as "daemons"; programs which run for a finite time are called "tasks" or "jobs". There are four daemons in the MONITOR system: (1) INDAEMON, the input daemon that collects information from, and sends information to, the respective FMD's; (2) DBDAEMON, the database daemon that collects information from the INDAEMON and OTDAEMON and stores it on the UNIFY database; (3) OTDAEMON, the output daemon that responds to commands from both INDAEMON and DBDAEMON as well as from agency personnel, which calls the FMD's to verify their installation at the proper location; and (4) EXDAEMON, the exceptions daemon that automatically produces reports whenever something unusual or exceptional has occurred within the MONITOR system. In addition to these four daemons, there are numerous programs within the MONITOR system that are not run as daemons, but are instead controlled by any one of the above-named daemons or agency personnel. Agency personnel control these tasks through a primary menu screen that is invoked by the command ADM. All of the programs that the agency personnel can invoke are made available through this menu.

Figure 24:
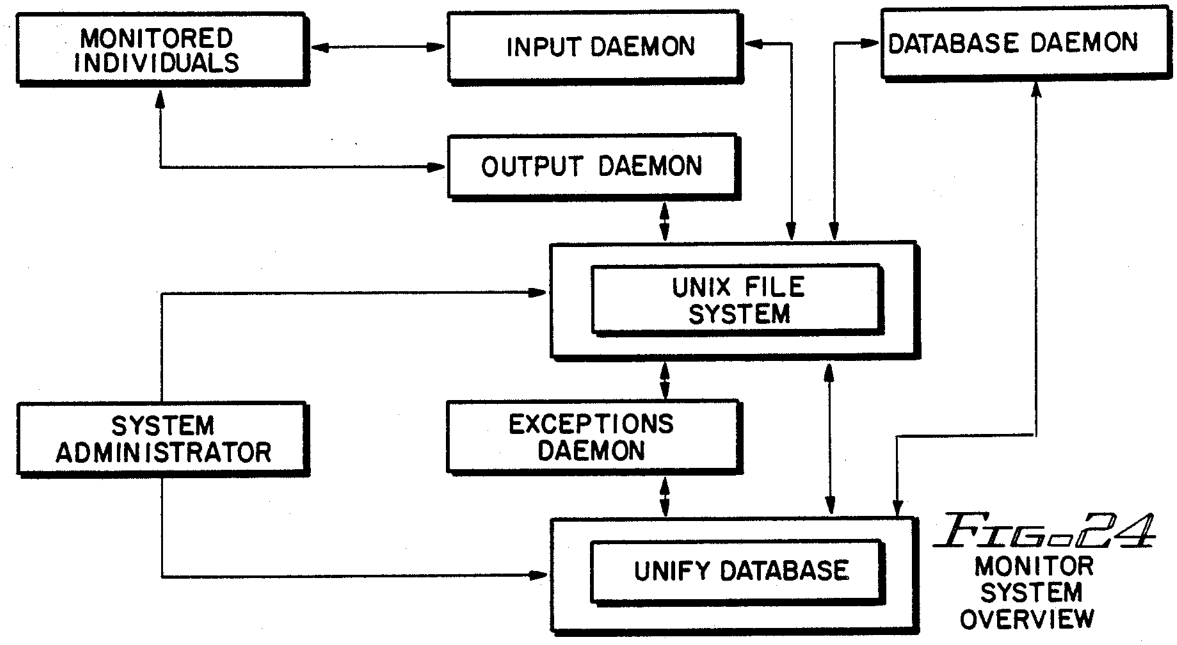
FIGS. 24–28 are flow charts illustrating the software structure and organization of the CPU of FIG. 1.
Figure 25:
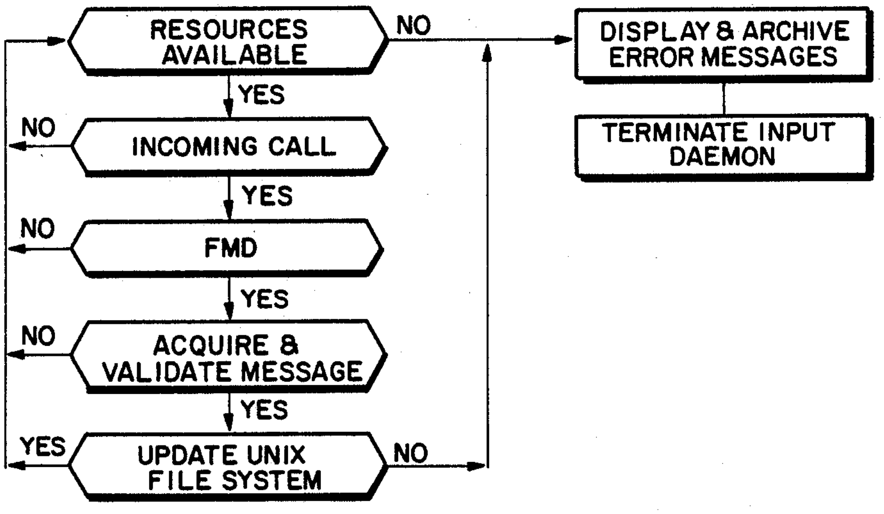
Figure 27:
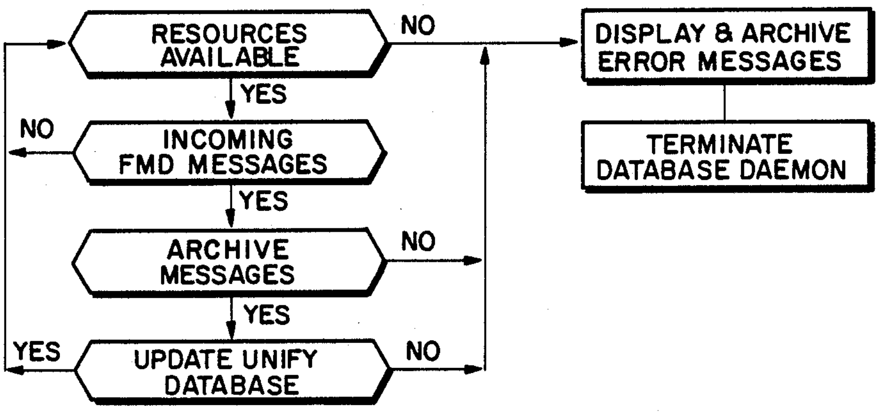
Figure 26:
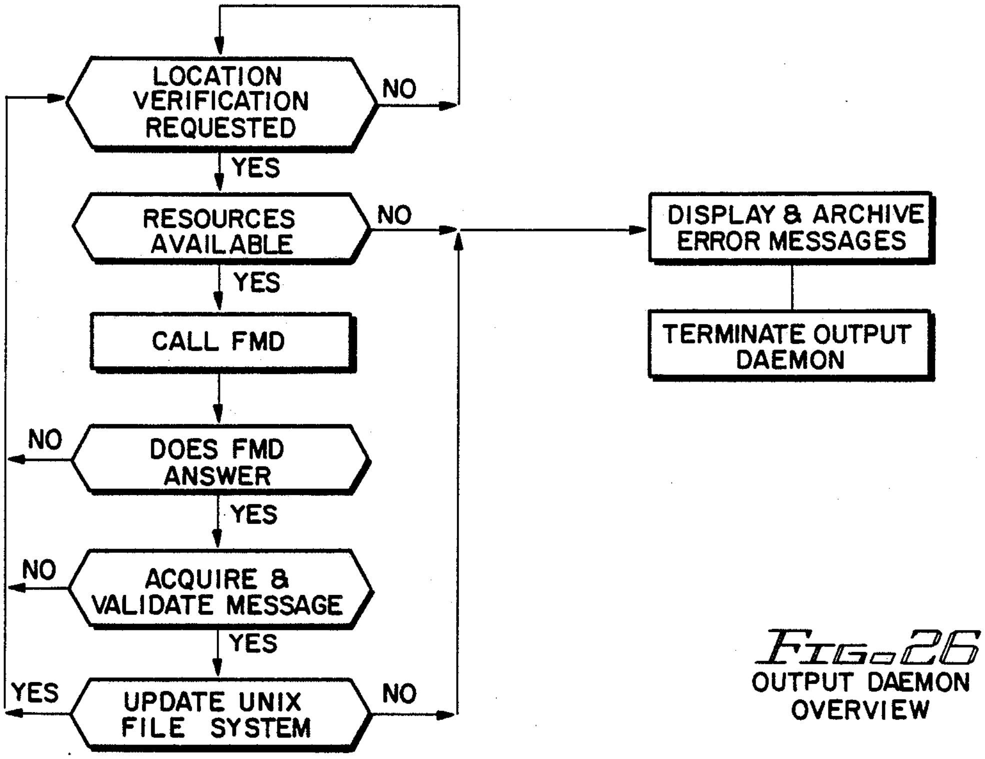
Figure 28:
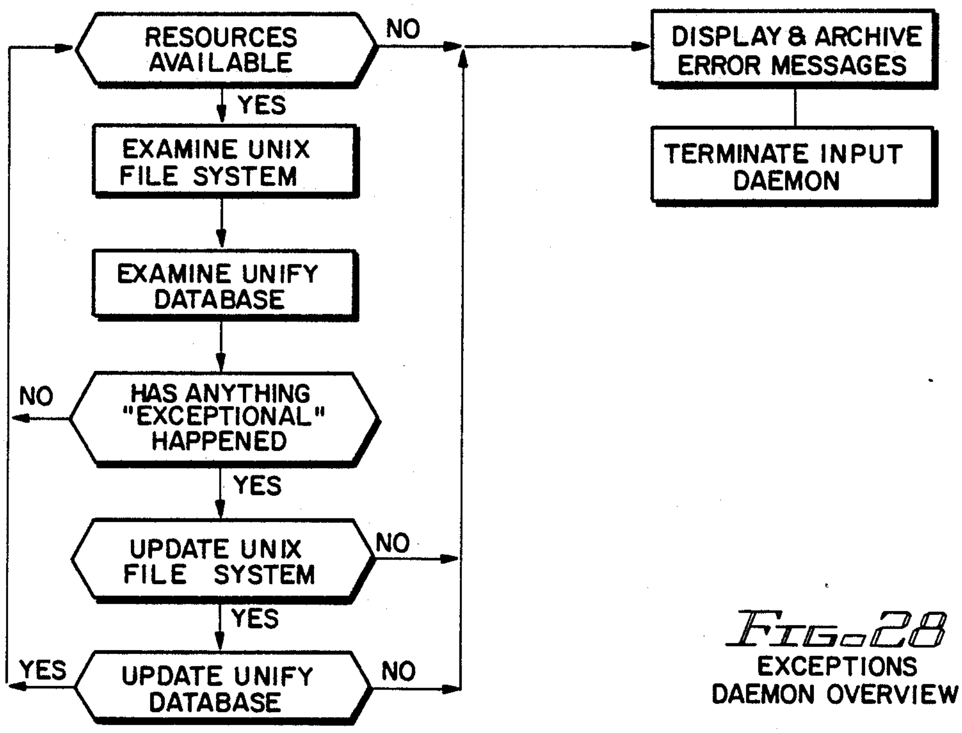

FIGS. 24 through 28 show various flow charts and graphs that illustrate the relationship between these various daemons and the basic operations that each perform. FIG. 24 shows an overview of the MONITOR system as it is configured in the UNIX CPU environment. FIG. 25 depicts an overview of INDAEMON, while FIG. 26 shows an overview of OTDAEMON. FIG. 27 illustrates an overview of DBDAEMON, and FIG. 28 presents an overview of EXDAEMON. These overviews are, of course, just a summary of what each daemon performs. Nonetheless, as a summary, it is submitted that they provide sufficient direction, when coupled with the other teachings presented herein, to enable those skilled in the art to practice the claimed invention.

While the present invention has been described by referring to specific embodiments and applications thereof, numerous variations and modifications could be made thereto by those skilled in the art without departing from the spirit and scope of the invention as claimed. Accordingly, the true scope of the invention is best determined by referring to the claims.

What is claimed is:

1. A system for monitoring the presence or absence of an individual within a defined area, said system comprising:

(a) an identification tag that is attached to the individual, said identification tag including:
a first power source,
sensing means for sensing prescribed conditions associated with the operation and use of said tag, and
means coupled to said first power source for periodically transmitting in short data bursts an identification signal including identification information that uniquely identifies said tag, and hence the individual to whom the tag is attached, and status information that indicates the prescribed conditions sensed by said sensing means;
(b) receiving means positioned within said defined area for receiving said identification signal;
(c) processing means coupled to said receiving means for noting the time of receipt and content of the received identification signals, from which time and content information a determination can be made as to the presence or absence of the individual within the defined area during any given time period; and
(d) tamper means included within said processing means for sensing one of a plurality of tamper conditions associated with the use of said processing means and for generating a tamper condition signal in the event that one of said plurality of tamper conditions occurs.

2. The monitoring system of claim 1 wherein the prescribed conditions sensed by said sensing means include whether the tag has remained attached to the individual.

3. The monitoring system of claim 1 wherein said sensing means comprises
means for holding the tag near the skin or flesh of the individual; and
first circuit means for sensing the presence or absence of said skin or flesh near said tag.

4. The monitoring system of claim 3 wherein said holding means comprises a conductive strap attached to said tag that fits around a limb of said individual and holds the tag against said limb.

5. The monitoring system of claim 4 wherein said sensing means further comprises second circuit means for sensing the continuity of said conductive strap, whereby the cutting or breaking of said strap can be sensed.

6. The monitoring system of claim 3 wherein said first circuit means comprises means for sensing a change in the coupling present between a surface of the tag and the skin or flesh of the individual.

7. The monitoring system of claim 1 wherein said processing means comprises:
field processing means located at a fixed location within said defined area and connected to said receiving means for initially processing, storing and monitoring the information contained in said identification signal, said field processing means having said tamper means included therewithin; and
central processing means, selectively coupled to said field processing means, for processing, storing and monitoring information received from said field processing means, said central processing means being located remote from said defined area.

8. The monitoring system of claim 7 where said field processing means includes mode control means for switching the operation of said field processing means from a sleep mode to an awake mode whenever one of a plurality of prescribed events occurs, said prescribed events including the receipt of data by said receiving means, the detection by said tamper means of one of said plurality of tamper conditions, and the timing out of a sleep period.

9. The monitoring system of claim 8 wherein said sleep period comprises approximately 120 seconds.

10. The monitoring system of claim 7 wherein said field processing means is selectively coupled to said central processing means through a telephone line, and wherein the central processing means includes dialing means for automatically dialing up said field processing means, and said field processing means includes answering means for automatically responding to the dialing means of said central processing means, whereby a connection can be established between said central processing means and said field processing means as controlled by said central processing means.

11. The monitoring system of claim 10 wherein said field processing means also includes dialing means and said central processing means include answering means for establishing a connection between said field processing means and said central processing means as controlled by said field processing means.

12. The monitoring system of claim 11 wherein said plurality of tamper conditions sensed by said tamper means of said field processing means includes a phone line tamper detect circuit.

13. The monitoring system of claim 10 wherein said central processing means includes polling means for randomly dialing up a plurality of said field processing means positioned at different locations remote from said central processing means.

14. The monitoring system of claim 13 wherein said central processing means includes report generating means for generating reports based on the information received from each field processing means.

15. The monitoring system of claim 1 wherein said means for periodically transmitting said identification signal includes stable radio frequency (RF) generating means for generating an RF carrier signal at a prescribed frequency for a short period of time, said RF carrier signal being modulated by the identification information and status information.

16. The monitoring system of claim 15 wherein said receiving means includes at least two spaced-apart receiving antennas, the distance between any two antennas being selected as a function of the wavelength of the prescribed frequency of said RF carrier signal.

17. The monitoring system of claim 1 further including repeater means selectively positioned within said defined area for receiving said identification signal and, after a prescribed delay, retransmitting said identification signal to said receiving means.

18. A system for monitoring the presence or absence of an individual within a defined area, said system comprising:

(a) an identification tag that is attached to the individual, said identification tag including:
a first power source,
sensing means for sensing prescribed conditions associated with the operation and use of said tag, and
means coupled to said first power source for periodically transmitting in short data bursts an identification signal including identification information that uniquely identifies said tag, and hence the individual to whom the tag is attached, and status information that indicates the prescribed conditions sensed by said sensing means, said transmitting means including stable radio frequency (RF) generating means for generating an RF carrier signal at a prescribed frequency, said RF carrier signal being modulated by the identification information and status information;

(b) receiving means positioned within said defined area for receiving said identification signal, said receiving means including at least two spaced-apart receiving antennas, the distance between any two antennas being selected as a function of the wavelength of the prescribed frequency of said RF carrier signal, said receiving means further including means for connecting only one of said at least two spaced-apart receiving antennas to an RF receiving circuit at any instant of time, all of said at least two spaced-apart receiving antennas having respective time periods for being connected to said RF receiving circuit;

(c) processing means coupled to said receiving means for noting the time of receipt and content of the received identification signals, from which time and content information a determination can be made as to the presence or absence of the individual within the defined area during any given time period; and (d) tamper means included within said processing means for sensing one of a plurality of tamper conditions associated with the use of said processing means and for generating a tamper condition signal in the event that one of said plurality of tamper conditions occurs.

19. A system for monitoring the presence or absence of an individual within a defined area, said system comprising:

(a) an identification tag that is attached to the individual, said identification tag including
a first power source,
sensing means for sensing prescribed conditions associated with the operation and use of said tag, and
means coupled to said first power source for periodically transmitting in short data bursts an identification signal including identification information that uniquely identifies said tag, and hence the individual to whom the tag is attached, and status information that indicates the prescribed conditions sensed by said sensing means;

(b) repeater means selectively positioned within said defined area for receiving said identification signal and, after a prescribed delay, retransmitting said identification signal to said receiving means, said repeater means including verification means for verifying that the received identification signal is a valid identification signal before said signal is retransmitted to said receiving means;

(c) receiving means positioned within said defined area for receiving said identification signal;

(d) processing means coupled to said receiving means for noting the time of receipt and content of the received identification signals, from which time and content information a determination can be made as to the presence or absence of the individual within the defined area during any given time period; and (e) tamper means included within said processing means for sensing one of a plurality of tamper conditions associated with the use of said processing means and for generating a tamper condition signal in the event that one of said plurality of tamper conditions occurs.

20. A house arrest monitoring system comprising:

a plurality of electronic tags, each including means for periodically transmitting an identification signal over a specified range;

a plurality of field monitoring devices, each of said field monitoring devices including means for receiving the identification signals transmitted by said tags when said tags are within the specified range of said field monitoring devices;

at least one central processing unit coupled to said field monitoring devices, said central processing unit including:
means for sorting, logging and processing the identification signals received from each of said field monitoring devices,
means for generating reports that document the identification signals received by said central processing unit, including the time at which any given identification signal was received and the identity of the field monitoring device from which it was received,
selection means for allowing an operator in contact with said central processing unit to select a desired report to be generated by said central processing unit;
monitoring means for monitoring the receipt of said identification signals received from said field monitoring devices and for automatically reporting any unusual patterns detected in the identification signals received.

21. The house arrest monitoring system of claim 20 wherein said field monitoring device holds the identification signals received from said tags until contacted by said central processing unit, at which time said field monitoring device sends the stored identification signals to said central processing unit.

22. The house arrest monitoring system of claim 21 wherein said electronic tags include means for sensing a tamper condition, and for including information in said identification signal as to whether a tamper condition has been detected by said tamper sensing means, said field monitoring device further including means for automatically contacting said central processing unit in the event that the identification signal received from any one of said plurality of electronic tags indicates that a tamper condition was sensed by the tamper sensing means within said tag.

23. The house arrest monitoring system of claim 22 wherein the monitoring means within said central processing unit further includes means for automatically generating a report in the event that an identification signal received by one of said plurality of field monitoring devices indicates a tamper condition was sensed by the tamper sensing means within one of said plurality of electronic tags, said automatically generated report including an identification of the electronic tag whereat the tamper condition occurred.

24. The house arrest monitoring system of claim 20 wherein the central processing unit is coupled to said plurality of field monitoring devices by means of a communication link established over a telephone line.

25. The house arrest monitoring system of claim 24 wherein said central processing unit includes means for contacting each of said field monitoring devices in a systematic fashion, such as by polling each field monitoring device in a prescribed order.

26. The house arrest monitoring system of claim 24 wherein said central processing unit includes means for contacting each of said field monitoring devices in a random fashion.

27. The house arrest monitoring system of claim 24 wherein said selection means of said central processing unit further includes means for manually selecting a given field monitoring device with which contact is to be made.

* * * * *